United States Patent [19]

Vassiliadis et al.

[11] Patent Number: 4,926,371
[45] Date of Patent: May 15, 1990

[54] TWO'S COMPLEMENT MULTIPLICATION WITH A SIGN MAGNITUDE MULTIPLIER

[75] Inventors: Stamatis Vassiliadis, Vestal; Eric M. Schwarz, Endicott; Baik M. Sung, Binghamton, all of N.Y.

[73] Assignee: International Business Machines Corporation, Armonk, N.Y.

[21] Appl. No.: 291,659

[22] Filed: Dec. 28, 1988

[51] Int. Cl.$^5$ ............................................... G06F 7/52
[52] U.S. Cl. .................................................... 364/760
[58] Field of Search .................................. 364/754-760

[56] References Cited

U.S. PATENT DOCUMENTS

| | | | |
|---|---|---|---|
| 3,617,723 | 11/1971 | Melvin | 235/164 |
| 3,730,425 | 5/1973 | Kindell et al. | 235/164 |
| 3,737,638 | 6/1973 | Esteban | 235/164 |
| 3,805,043 | 4/1974 | Clary | 235/164 |
| 3,866,030 | 2/1975 | Baugh et al. | 235/164 |
| 4,130,878 | 12/1978 | Balph et al. | 364/758 |
| 4,507,749 | 3/1985 | Ohhashi | 364/757 |
| 4,594,679 | 6/1986 | George et al. | 364/754 |
| 4,718,031 | 1/1988 | Nukiyama | 364/757 |
| 4,748,582 | 5/1988 | New et al. | 364/754 |
| 4,796,218 | 1/1989 | Tanaka et al. | 364/748 |
| 4,796,219 | 1/1989 | Williams | 364/758 |

OTHER PUBLICATIONS

C. S. Wallace, "A Suggestion for a Fast Multiplier", IEEE Trans. on Electronic Computers, Feb. 1964, pp. 14–17.
IEEE Transactions article by Charles R. Baugh et al., vol. C-22, No. 12, pp. 1045–1047, Dec. 1973 entitled "A Two's Complement Parallel Array Multiplication Algorithm".
IEEE Transactions article by Stylianos D. Pezaris, Apr. 1971, entitled "A 40-NS 17-Bit by 17-Bit Array Multiplier", pp. 442–447.

Primary Examiner—Gary V. Harkcom
Assistant Examiner—Long T. Nguyen
Attorney, Agent, or Firm—Baker, Maxham, Jester & Meador

[57] ABSTRACT

A multi-bit overlapped scanning multiplication system using overlapped partial products in a matrix, accepts and multiplies either sign-magnitude operands or signed binary operands without correction, conversion, or complementation of operands or results.

8 Claims, 11 Drawing Sheets

FIG. 2

| $|W_j|$ | $S_j X_{sm} |W_j|$ | | | | | | | |
|---|---|---|---|---|---|---|---|---|
| | $2^2$ | $2^1$ | $2^0$ | $2^{-1}$ | ... | $2^{-(n-3)}$ | $2^{-(n-2)}$ | $2^{-(n-1)}$ |
| $|W_j|=0$ | 0 | 0 | 0 | 0 | ... | 0 | 0 | 0 |
| $|W_j|=1$ | $X_0^*$ | $X_0^*$ | $X_0^*$ | $X_1^*$ | ... | $X_{n-3}^*$ | $X_{n-2}^*$ | $X_{n-1}^*$ |
| $|W_j|=2$ | $X_0^*$ | $X_0^*$ | $X_1^*$ | $X_2^*$ | ... | $X_{n-2}^*$ | $X_{n-1}^*$ | $0^*$ |
| $|W_j|=3$ | $(3X)_0^*$ | $(3X)_1^*$ | $(3X)_2^*$ | $(3X)_3^*$ | ... | $(3X)_{n-1}^*$ | $(3X)_n^*$ | $(3X)_{n+1}^*$ |
| $|W_j|=4$ | $X_0^*$ | $X_1^*$ | $X_2^*$ | $X_3^*$ | ... | $X_{n-1}^*$ | $0^*$ | $0^*$ |

$2^1 \quad 2^0 \quad 2^{-1} \quad 2^{-2} \quad 2^{-3} \quad 2^{-4} \quad \cdots \cdots \quad 2^{-[3(m+1)-1+n-1]}$ $-\Pi_{-2} \quad \Pi_{-2} \quad \Pi_{-1} \quad \Pi_0 \quad \Pi_1 \quad \Pi_2 \quad \cdots \Pi_{n-1} \, 0 \, 0 \, \delta$ $-\Pi_{-2} \quad \Pi_{-2} \quad \Pi_{-2} \quad \Pi_{-2} \quad \Pi_{-2} \quad \Pi_{-1} \quad \Pi_0 \quad \cdots \quad \cdots \Pi_{n-1} \, 0 \, 0 \, \delta$ $-\Pi_{-2} \quad \Pi_{-2} \quad \Pi_{-2} \quad \Pi_{-2} \quad \Pi_{-2} \quad \Pi_{-2} \quad \cdots \quad \cdots \quad \cdots \cdots \Pi_{n-1} \, 0 \, 0 \, \delta$ $-\Pi_{-2} \quad \Pi_{-2} \quad \Pi_{-2} \quad \cdots \quad \cdots \quad \cdots \quad \cdots \quad \Pi_{n-1}$

$$
\begin{array}{cccccccccc}
2^1 & 2^0 & 2^{-1} & 2^{-2} & 2^{-3} & 2^{-4} & \cdots & & & 2^{-[3(m+1)-1+n-1]} \\
-\Pi_{-2} & \alpha & \Pi_{-1} & \Pi_0 & \Pi_1 & \Pi_2 & \cdots \Pi_{n-1} 0\ 0\ \delta & & & \\
-\Pi_{-2} & \alpha & \alpha & \alpha & \alpha & \Pi_{-1} & \Pi_0 \cdots & \cdots \Pi_{n-1} 0\ 0\ \delta & & \\
-\Pi_{-2} & \alpha & \alpha & \alpha & \alpha & \alpha & \cdots & \cdots \Pi_{n-1} 0\ 0\ \delta & & \\
\vdots & \vdots & \vdots & \vdots & \vdots & \vdots & & & & \\
\vdots & \vdots & \vdots & \vdots & \vdots & \vdots & & & & \\
-\Pi_{-2} & \alpha & \alpha & & & & & & & \Pi_{n-1} \\
\end{array}
$$

$$
\begin{array}{ccccccccc}
2^{-1} & 2^{-2} & 2^{-3} & 2^{-4} & \cdots & & & & 2^{-[3(m+1)-1+n-1]} \\
\Pi_{-1} & \Pi_0 & \Pi_1 & \Pi_2 & \cdots \Pi_{n-1} 0\ 0\ \delta & & & & \\
\alpha & \alpha & \alpha & \Pi_{-1} & \Pi_0 \cdots & \cdots \Pi_{n-1} 0\ 0\ \delta & & & \\
\alpha & \alpha & \alpha & \alpha & \cdots & \cdots \Pi_{n-1} 0\ 0\ \delta & & & \\
\vdots & \vdots & \vdots & \vdots & & & & & \\
\vdots & \vdots & \vdots & \vdots & & & & & \\
\alpha & & & & & & & & \Pi_{n-1} \\
\end{array}
$$

FIG. 7A
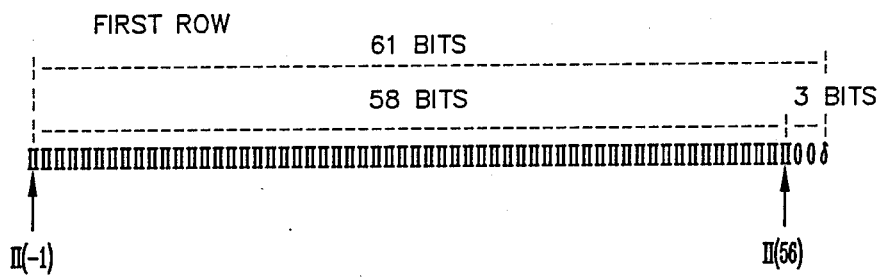
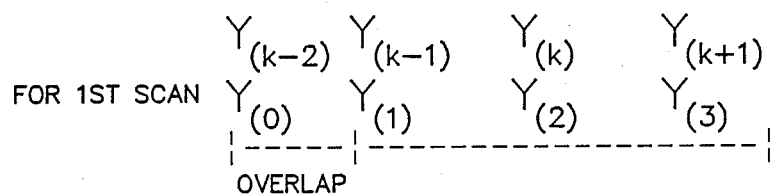
FIG. 7B
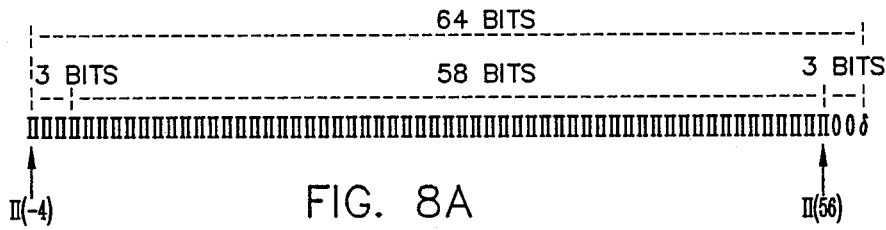
FIG. 8A
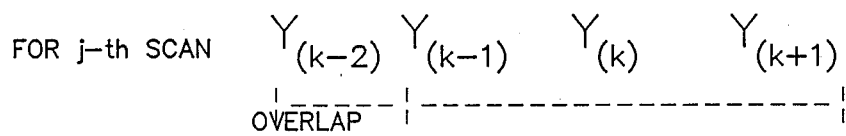
FIG. 8B

M+1 SHIFTED PARTIAL PRODUCTS
WITH APPENDED, SIGN ENCODING BITS

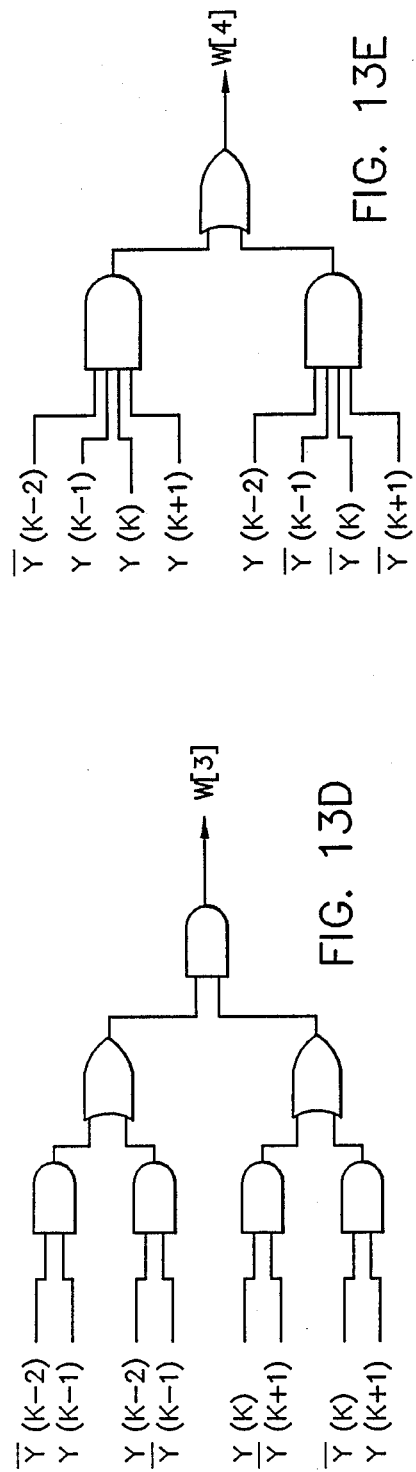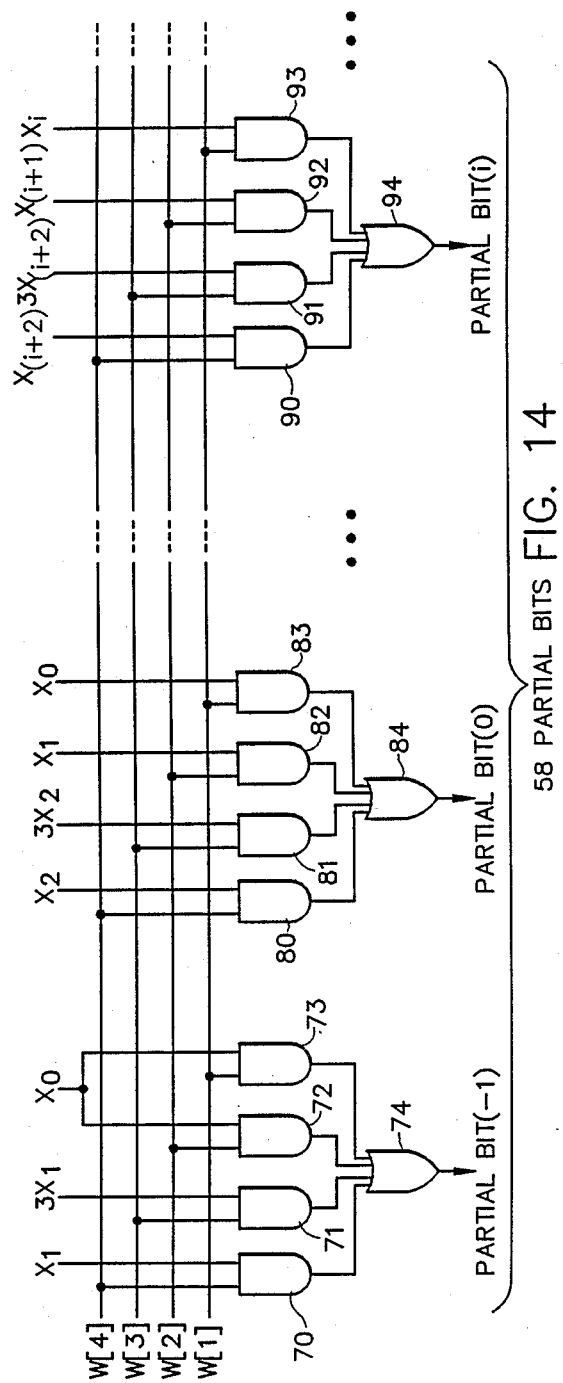

TWO'S COMPLEMENT MULTIPLICATION WITH A SIGN MAGNITUDE MULTIPLIER

This invention relates to multiplication of binary digits by overlapped, multiple-bit scanning and, more particularly, to a multiplier which multiplies two multibit, binary digits, both being either sign magnitude or signed binary numbers.

The realization of a multiplier which multiplies a pair of binary digits to produce a result is complexified when the form of the numbers is considered. As is known, binary digits can be represented as a combination of a plurality of magnitude bits with an appended sign bit. The magnitude bits represent an absolute magnitude of the number, while the sign bit denotes a positive or negative magnitude. Another type of representation is signed binary, which is rendered by complementation of the absolute value of the number. Most frequently used is two's complement. In this representation, complementation of the original magnitude embeds the sign of the number in the representation of its magnitude.

Since the sign of a two's complement number cannot be separated from its absolute value, as is the case with the sign magnitude representation, multiplication hardware for both representations requires correction or conversion of one representational form. Correction and conversion, of course, imply the necessity of additional hardware and time.

There are at least three common ways to perform two's complement multiplication using the sign magnitude multiplier. In the first method, the two's complement operands are precomplemented to produce sign magnitude numbers. The resulting sign magnitude numbers are then multiplied, with the result being rendered back into two's complement form with post complementation. This scheme exacts an additional cost in hardware and procedure cycles. Hardware must be added to perform the complementation, and time is consumed to perform it. Hardware can be saved if the pre- and post-complementation are performed in the adder hardware. This may result, however, in more cycles yet to perform the multiplication, and require addition of multiplexing hardware for adder inputs.

In another technique, operands are sensed prior to multiplication and conditionally complemented. If both operands are positive, neither pre-, nor post-complementation is required. Multiplying two oppositely signed numbers requires only precomplementation of one operand and post complementation; and multiplying two negative numbers requires precomplementation for both operands. The implication is that sensing the operands will improve the overall performance of signed magnitude multiplication. This technique also requires extra hardware and adds operation cycles. This approach is the most commonly used in the realization of binary multipliers; for example, see U.S. Pat. No. 4,594,679.

Last, two's complement multiplication using sign magnitude circuitry can be realized with the use of specialized types of adders to perform element addition and subtraction. See, for example, S. D. Pesaris, "A Forty-ns 17-bit Array Multiplier, "IEEE TRANSACTIONS ON COMPUTERS, Vol C-20 TP 442-447, Apr. 1971. This case requires the availability of four types of adders which are frequently not realized fully in a selected technology. A full adder is required which requires the creation and manipulation of a multiplication matrix. In a matrix, correction rows are added to the existing matrix for negative terms presented in the two's complement multiplication. This requires additional hardware and delay for the overall multiplication.

A significant advance in the design of multipliers would result from a multiplier capable of multiplying a pair of operands, which are either both sign magnitude or both two's complement, to produce a result, the multiplication being conducted without precomplementation, post-complementation, specialized adders, extra correction rows for a matrix, or operand sensing requiring additional branching to perform two's complement multiplication.

SUMMARY OF THE INVENTION

In the invention, a new scheme is provided for hardware implementation of a multiplier capable of multiplying either two sign magnitude operands or two two's complement operands without the requirement for complementation, operand sensing, or complicated matrices.

A further object of this invention is to establish a scheme that utilizes a sign magnitude multiplier to perform multiplication of either sign magnitude or two's complement operands with a slight elaboration to the basic complement of hardware, with no additional time for performing the operation, and without the encumbrances of the prior art multipliers.

A further object of this invention is to produce an apparatus for two's complement multiplication which multiplies a pair of two's complement operands in the same amount of time as a pair of sign magnitude operands.

An advantage of this invention is the elimination of pre- and post-complementation cycles in hardware through operands end result.

Another distinct benefit of this invention is elimination of the need for specialized circuitry for element addition/subtraction and for expansion of the basic partial product matrix.

According to the invention, in the multiplication of the pair of operands, a matrix of partial product terms is formed in accordance with an algorithm, with each partial product including appended sign encoding bits. For two n-bit operands, the matrix is developed by scanning the multiplier operand to obtain a sequence of bit groups. Each group includes s successive bits of the multiplier and overlaps an adjacent group by one bit, and $s \geq 3$. A matrix assembler receives the partial products obtained by multiplying the multiplier with the multiplicand bit groups and produces the sequence of partial products assembled into a matrix including $m+1$ offset rows, where $m = \text{INT}[n-1)/(s-1)]$, each matrix row including one of the partial products. A sign encoder is included in the matrix assembler and responds to the sequence of multiplier bit groups or to a multiplicand sign bit by appending sign encoding bits onto a partial product to complete a respective row of the matrix. Last, an adder circuit is connected to the matrix assembler for adding the partial products, with sign encoding bits appended, to produce the product of the two operands.

As the algorithm described below sets out, the sign encoder, in generating the sign encoding bits in response to either the multiplier bit group or a multiplicand sign bit, improves the prior art sign magnitude overlapped scanning multiplier by enabling it to multiply operands which are in either sign magnitude or two's complement form without pre or post complementation.

Other advantages and objects of this invention will become evident when the following detailed description is read in reference to the below-described drawings.

BRIEF DESCRIPTION OF THE DRAWINGS

FIG. 2 illustrates the generation of terms in the middle rows of an offset partial product matrix.

FIGS. 3, 4 and 5 illustrate forms of a partial product matrix that trace the development of the matrix according to the invention.

FIGS. 6, 7A, 7B, 8A, 8B, 9A and 9B are schematic diagrams illustrating the formation of a matrix of the invention.

FIGS. 13a, 13b, 13c, 13d, 13e are schematic circuit diagrams of a portion of the COMBINE circuit of the embodiment of the invention which produce coefficients used in formation of an offset partial product.

FIG. 14 is a schematic circuit diagram illustrating a partial bit generator in the matrix assembler of the embodiment of the invention.

DETAILED DESCRIPTION OF THE PREFERRED EMBODIMENT

Array multiplication is a known technique for obtaining the product of two n-bit, binary digital numbers. A broadly used algorithm for such multiplication is the overlap shift method for three-bit scanning reported by MacSorley in "High-Speed Arithmetic in Binary Computers", PROCEEDINGS OF THE IRE, VOL 99, Jan. 1961. In the scanning multiplication technique, a multi-bit multiplicand is multiplied by a multi-bit multiplier to produce a multi-bit product. The scanning of the technique involves "scanning" the multiplier by taking sequential multiplier bit groups and then multiplying the multiplicand by each bit group to produce partial product terms, thereby effectively reducing the numbers of partial products required. In U.S. patent application Ser. No. 116,172 filed on Nov. 3, 1987, and assigned to the assignee of this application, a representative technique and means for overlapped multiple-bit scanning are taught in which the bit groups of the multiplier consists of more than three bits. For the example of its specific embodiment, that patent application is incorporated herein by reference.

In the incorporated patent application, an overlapped scanning multiplication system assembles modified partial products in a reduced matrix by increasing the size of multiplier bit groups with which the multiplicand is scanned beyond three. In addition, each multiplier bit group is overlapped by one bit with an adjacent bit group. When a negative partial product term is produced, a "hot 1" is encoded in an extension to the partial product term in the previous row, thus avoiding the need for adding a row for this purpose. Instead of extending each row to the left edge of the matrix, rows are extended with bands of encoded extensions of limited length at each end of the partial product terms.

In this description, a sign magnitude operand is taken to be a multi-bit binary digit with n consecutive bits. A multiplicand operand X has the following notation:

$$X_0 X_1 X_2 \ldots X_{n-2} X_{n-1}$$

where $X_0$ is the sign bit, and bits $X_1$–$X_{n-1}$ present the magnitude in descending significance from $X_1$ through $X_{n-1}$.

Similarly, a multiplicand operand in sign magnitude form includes n bits numbered from $Y_0$ through $Y_{n-1}$, with $Y_0$ being the sign bit, and $Y_1$ through $Y_{n-1}$ magnitude bits whose significances decrease from $Y_1$.

In this embodiment, signed binary operands are at most (n−(s−1)) bits wide. Thus, a signed binary multiplicand operand has bits $X_0$–$X_{n-s}$ with $X_0$ being the sign bit, and the remaining bits decreasing in significance through $X_{n-s}$. The signed binary multiplier operand has similar notation. In the embodiment, s−1 replications of the sign bit of a signed binary number are appended to the left of the sign bit, thereby giving these numbers the n-bit width of sign magnitude numbers.

Figure 1:
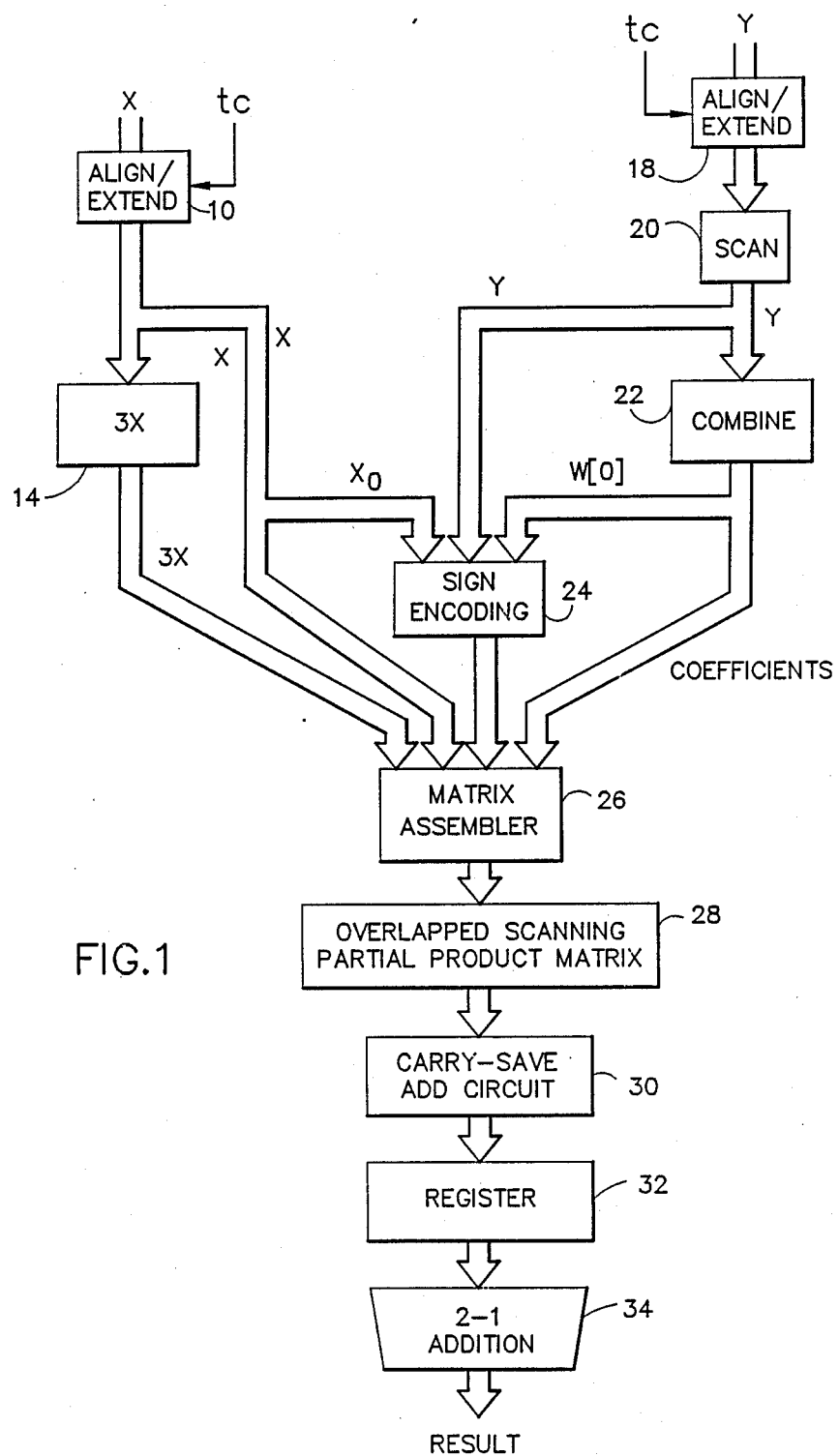
FIG. 1 illustrates, in block diagram form, an embodiment of the invention.

In the system of FIG. 1, a multiplicand X is provided to an alignment and extension circuit 10 activated by a two's complement indicator (tc). If the tc signal is activated, X is a two's complement number. Activation of the tc signal will align the least significant bit of the operand X with the least significant bit of a sign magnitude number and extend the sign bit X by s−1 replications, thereby rendering X as an n-bit signed binary number. If the tc signal is inactive, X is a sign magnitude number requiring no alignment or extension. A 3X multiplier 14 multiplies a bit $X_i$ of X by standard left-shift and add technique to producer $3X_i$. multiplier Y is subjected to an align/extend circuit 18 identical with that indicated by reference numeral 10. The n-bit operand is then scanned in the scan means 20. As is known in the art, the scan means 20 will produce a sequence of multiplier bit sets, each bit set including s bits, successive bit sets overlapping one bit of an adjacent bit set. For example, in the illustrative case, when s=4, the first scan of Y will output the values of the first four bits of Y, that is, $Y_0$, $Y_1$, $Y_2$, and $Y_3$. The second scan will output the values of $Y_3$, $Y_4$, $Y_5$, and $Y_6$. The third scan will output the values of the sixth through ninth bits of Y and so on until all of the bits of Y have been scanned. If, for example, Y consists of 56 bits plus a sign bit, 19 scans of Y will be output by the scan means 20.

The output of the scan means is applied to a combining circuit 22, which combines the bits of a multiplier bit set to produce values of a coefficient W for the current scan. In addition, the current scan of Y is provided to a sign encoding circuit 24. The sign encoding circuit 24 receives the multiplicand sign bit $X_0$, the coefficient W[0], and bits from the current scan of Y to encode bits which are appended onto the partial products.

The coefficients, the values of X including 3X, and sign encoding bits are all provided to a matrix assembler 26 which produces an overlapped scanning matrix, row-by-row, in which each row includes a partial product with appended sign encoding bits. The matrix is indicated by reference numeral 28, which may denote, for example, main storage, or RAM storage where current results are stored. It is also contemplated that the practice of this invention will accommodate carry-save addition techniques in which an entire matrix will not be assembled. Rather, as each row is produced, it will be combined with the sum of all the previous rows until the final product is achieved. For an understanding of this technique, see the incorporated patent application.

A matrix is then added by an adder circuit to produce the multiplication result. Many adder circuits are known which can be used for combining the partial products to produce the result. For example, a set of carry save adder trees 30 can be provided which reduce the columns of the matrix to no more than two terms: carry and sum. These columns are added, typically in the next cycle, by a 2:1 adder 34, yielding the result. This set of adder components can be understood, for example, with reference to the incorporated patent application.

Turning now to the encoding of the matrix for s-bit overlapped scanning, the following describes a multiplier for fixed point operands in two's complement notation using the hardware of a floating point, sign magnitude notation multiplier. The fixed point and floating point operations are computed in the same number of cycles after the loading of the operands. The changes needed to sign magnitude hardware to compute both types of multiplication are described.

THE SIGN MAGNITUDE MULTIPLIER

Let $X_{sm}$ be a n-bit sign magnitude fraction number, then, $$\text{Let } X_{sm} = (-1)^{x_0} \sum_{i=1}^{n-1} X_i 2^{-i}$$

Assume the multiplication of the two absolute values of two sign magnitude numbers, $X_{sm}$ and $Y_{sm}$, and their sign manipulation separately. Then it can be stated that:

$$X_{sm} = -X_0 + \sum_{i=1}^{n-1} X_i 2^{-i} \text{ such that } X_0 = 0 \quad (1)$$

$$Y_{sm} = -Y_0 + \sum_{i=1}^{n-1} Y_i 2^{-i} \text{ such that } Y_0 = 0 \quad (2)$$

It can be proven that:

$$Y_{sm} = \sum_{j=1}^{m+1} W_j 2^{-[j(s-1)-1]} \quad (3)$$

such that: $m = \text{INT}[(n-1)/(s-1)]$ where INT = integer division, s is the number of bits being scanned, and $s \geq 2$.

$$W_j = -Y_{(s-1)(j-1)} 2^{(s-2)} + Y_{(s-1)j} + \sum_{l=1}^{s-2} Y_{[(s-1)(j-1)+l]} 2^{-[l+1-(s-1)]}$$

For ease of discussion,

Let $s = 4$, then $$W_j = -Y_{3(j-1)} 2^2 + Y_{3j} + \sum_{l=1}^{2} Y_{[3(j-1)+l]} 2^{-(l+1-3)}$$

$$= -Y_{3(j-1)} 2^2 + Y_{[3(j-1)+1]} 2^1 + Y_{[3(j-1)+2]} + Y_{3j}$$

and $$X_{sm} Y_{sm} = X_{sm} W_1 2^{-2} + X_{sm} W_2 2^{-5} + \ldots + X_{sm} W_{m+1} 2^{-[3(m+1)-1]}$$

$$= S_1 X_{sm} |W_1| 2^{-2} + S_2 X_{sm} |W_2| 2^{-5} + \ldots + S_{m+1} X_{sm} |W_{m+1}| 2^{-[3(m+1)-1]}$$

such that $S_j |W_j| = W_j$ (i.e., $S_j$ = the sign of $W_j$)

and let k be proportional to j such that $k = (s-1)j - 1$.

THEOREM 1

$S_j X_{sm} |W_j|$ can be rewritten as $$\theta_j^* = -\pi_{-2} 2^2 + \pi_{-1} 2^1 + \pi_0 2^0 + \sum_{i=1}^{n-1} \pi_i 2^{-i}$$

with the possibility of a "hot 1" added, where $\pi_{-2} = (X_0^* \rightarrow W[3] \rightarrow W[0]) + ((3X)_0 * W[3])$ (2.1)
$\pi_{-1} = \rightarrow W[0][(X_1 * W[4]) + ((3X)_1 * W[3]) + (X_0 * (W[2-]+W[1]))]$ (2.2)
$\pi_0 = \rightarrow W[0][(X_2 * W[4]) + ((3X)_2 * W[3]) + (X_1 * W[2]) + (X_0 * W[1])]$ (2.3)
$\pi_i = \rightarrow W[0][(X_{i+2} * W[4]) + ((3X)_{i+2} * W[3]) + (X_{i+1} * W[2]) + (X_i * W[1])]$ (2.4)

and such that $X_i^* = X_i$ if $S_j = 0$ or $X_i^* = \rightarrow X_i$ if $S_j = 1$, with W[L] "ON" when $|W| = L$ and (W[L] mutually exclusive W[K] when $L \neq K$.

NOTE: Some bit positions ($\pi$) and W(L) depend on j. For ease of comprehension and notation such dependencies have been omitted.

Proof

Given that $|W_j| \leq 2^2 ((S_j X_{sm} |W_j|)_{max} = 2^2 X_{sm})$ and because sign extension preserves values, $S_j X_{sm} |W_j|$ can be represented as in FIG. 2. From FIG. 2, it can be easily verified that: If $S_j = 0$, then $\theta_j^*$ is the correct representation of $S_j X_{sm} |W_j|$. If $S_j = 1$, then a "hot 1" must be appended at position $2^{-(n-1)}$ position. Therefore, theorem 1 holds true.

It may be observed that $X_0$ is always equal to $(3X)_0$. Thus, $\pi_{-2} = X_0^* W[0]$. It is also true that because $X_0 = 0$, $\pi_{-2} = X_0^*$. However, this may not always be the case for other representations such as the two's complement notation to be considered later.

Let $S_j X_{sm} |W_j| = \theta_j$, then it can be proven that for every $1 \leq j \leq m$, $$\theta_j = \theta_j^* + \delta 2^{-[(n-1)+3]}$$

such that: $\delta = 0$ if $S_{j+1} = 0$, or $\delta = 1$ if $S_{j+1} = 1$. When $j = m+1$,
$S_{m+1} X_{sm} |W_{m+1}| = \theta_{m+1}^*$ This is because no more extension is necessary due to the fact that there are no more rows (or scans) to follow, Given that $W_1 \geq 0$, $\delta_1$ is always positive and there is no need for an extra row for adding a possible "hot 1". Thus, $$X_{sm} Y_{sm} = \theta_1 2^{-2} + \theta_2 2^{-5} + \ldots + \theta_j 2^{-[3j-1]} + \ldots + \theta_{m+1} * 2^{-[3(m+1)-1]} \quad (2.5)$$

(2.5) represents a matrix containing m+1 rows starting at column $2^0$ and ending at column $2^{-[3(m+1)-1+n-1]}$.

Given that sign extension will not change $\theta_j$ for $1 \leq j < m+1$, it can be stated that $$\theta_j = \left[ -\pi_{-2}2^{(3j-1)+1} + \ldots + \pi_{-2}2^2 + \right.$$

$$\left. \pi_{-1}2^1 + \pi_0 2^0 + \sum_{i=1}^{n-1} \pi_i 2^{-i} + \delta 2^{-[(n-1)+3]} \right]$$

thus, the j-th row of (2.5) can be written as:

$$\Phi_j = \theta_j 2^{-[3j-1]} = \tag{2.6}$$

$$\left[ -\pi_{-2}2^{(3j-1)+1} + \ldots + \pi_{-2}2^2 + \right.$$

$$\left. \pi_{-1}2^1 + \pi_0 2^0 + \sum_{i=1}^{n-1} \pi_i 2^{-i} + \delta 2^{-[(n-1)+3]} \right] 2^{-(3j-1)}$$

Analogous conclusions can be reached for $\Phi_{m+1}*$. The representation of $\Phi_j$ in (2.6) implies that the $X_{sm}Y_{sm}$ matrix will not change value when added as represented in FIG. 3. Given that the positions of the product starting at $2^{-1}$ are of interest, the product bits corresponding to the positions $2^1$, $2^0$ need not to be considered. In regard to the multiplication, it can be stated that the matrix in FIG. 5 corresponds to the matrix in FIG. 4. Note that, in FIG. 5, $\alpha = \pi_{-2}$, or is of interest in the product. In the incorporated patent application it is proven that the lower triangle matrix containing the $\alpha$'s is equivalent to:

$$LTMSN = \left( \sum_{j=2}^{m+1} -\alpha_j 2^{[-3(j-1)]} \right) + 1, \tag{2.6a}$$

where $\alpha_j$ represents the sign of the j-th row. Now, $\alpha_j=1$ if and only if the j-th row is negative. It also can be proven that the lower triangular matrix is equivalent to a sign encoding into the band of the matrix. The encoding can be embedded in $\Phi_j$ as follows:

THEOREM 2

$$\Phi_j = \left[ \sum_{l=0}^{2} \rightarrow S_j 2^{l+2} + \sum_{l=1}^{2} S_j 2^{l+2} + \pi_{-1}2^1 + \right.$$

$$\left. \pi_0 2^0 + \sum_{i=1}^{n-1} \pi_i 2^{-i} + \delta 2^{-(n-1+3)} \right] 2^{-(3j-1)},$$

such that $2 \leq j \leq m$ and $S_j = 1$ if and only if $W_j < 0$.

Proof

The sign encoding depends on $S_j$ because $S_j$ alone determines the 1 or 0 extension. That is, given that $X_0$, the sign bit, is always 0, $S_j$ determines if $\Phi_j$ is a positive or negative number. Therefore, Case 1:
  $S_j=0$, meaning that $W_j \geq 0$, $$\Phi_j = \left[ \sum_{l=0}^{2} 2^{l+2} + \pi_{-1}2^1 + \sum_{i=1}^{n-1} \pi_i 2^{-i} + \delta 2^{-(n-1+3)} \right] 2^{-(3j-1)}$$

$$= \left[ 2^4 + 2^3 + 2^2 + \pi_{-1}2^1 + \pi_0 2^0 + \sum_{i=1}^{n-1} \pi_i 2^{-i} + \delta 2^{-(n-1+3)} \right] 2^{-(3j-1)}$$

The implication is that "1 1 1" has been added on the j-th row if $S_j=0$, which proves the validity of Theorem 2 by placing the right encoding as taught in the incorporated patent application.

Case 2:
  $S_j=1$, meaning that $W_j<0$, and $$\Phi_j = \left[ \sum_{l=1}^{2} 2^{l+2} + \right.$$

$$\left. \pi_{-1}2^1 + \pi_0 2^0 + \sum_{i=1}^{n-1} \pi_i 2^{-i} + \delta 2^{-(n-1+3)} \right] 2^{-(3j-1)},$$

which is equivalent to:

$$\Phi_j =$$

$$\left[ 2^4 + 2^3 + 0 \cdot 2^2 + \pi_{-1}2^1 + \sum_{i=0}^{n-1} \pi_i 2^{-i} + \delta 2^{-(n-1+3)} \right] 2^{-(3j-1)}$$

which corresponds to the right encode "1 1 0" for $S_j=1$ as taught in the incorporated patent application. Therefore, Theorem 2 holds true.

THEOREM 3

$$\Phi_{m+1} = \left[ -S_j 2^5 + \sum_{l=0}^{2} S_j 2^{l+2} + \right.$$

$$\left. \pi_{-1}2^1 + \pi_0 2^0 + \sum_{i=1}^{n-1} \pi_i 2^{-i} \right] 2^{-[3(m+1)-1]}$$

Proof

Case 1:
  $S_j=0$ then $$\Phi_{m+1} = \left[ 2^5 + \pi_{-1}2^1 + \pi_0 2^0 + \sum_{i=1}^{n-1} \pi_i 2^{-i} \right] 2^{-[3(m+1)-1]},$$

which is equivalent of encoding '1 0 0 0' in the front $|\Phi_{m+1}|$. This corresponds to the right encode of the last row as taught in the incorporated patent application.

Case 2:
  $S_j=1$ then $$\Phi_{m+1} = \left[ 2^4 + 2^3 + 2^2 + \pi_{-1}2^1 + \pi_0 2^0 + \sum_{i=1}^{n-1} \pi_i 2^{-i} \right] 2^{-(3j-1)},$$

which is equivalent to encoding "0 1 1 1" in front of $|\Phi_{m+1}|$ and which corresponds to the right encode as taught in the incorporated patent application when $S_j$ is negative. Thus, Theorem 3 holds true.

THEOREM 4

$$X_{sm}Y_{sm} = \Phi_1 + \sum_{j=2}^{m} \Phi_j + \Phi_{m+1}$$

such that $$\Phi_1 = \left[\sum_{i=1}^{n-1} \pi_i 2^{-i} + \delta 2^{-[(n-1)+3]}\right]2^{-2}$$

$$\Phi_j = \left[\sum_{l=0}^{2} S_j 2^{l+2} + \sum_{l=1}^{2} S_j 2^{l+2} + \pi_{-1}2^1 + \right.$$

$$\left. \pi_0 2^0 + \sum_{i=1}^{n-1} \pi_i 2^{-i} + \delta 2^{-(n-1+3)}\right]2^{-(3j-1)}$$

$$\Phi_{m+1} = \left[S_{m+1}2^5 + \sum_{l=0}^{2} S_{m+1}2^{l+2} + \pi_{-1}2^1 + \right.$$

$$\left. \pi_0 2^0 + \sum_{i=1}^{n-1} \pi_i 2^{-i}\right]2^{-[3(m+1)-1]}$$

Proof

Trivial from theorems 1, 2, and 3 and equation (2.6).

THE TWO'S COMPLEMENT MULTIPLICATION

Theorem 4 dictates the formulation of a sign magnitude multiplication. It may be asked whether such a device can be used to compute a two's complement number multiplication. The following derivations describe how the sign magnitude multiplier can be used to compute both sign magnitude and two's complement multiplication with neither hardware correction nor extra delay and with but minimal modification on the hardware. Assume two n-bit two's complement non-fractional numbers, $X_{tc}$ and $Y_{tc}$, and consider multiplication, $X_{tc}Y_{tc}$, $$X_{tc} = -X_{n-1}2^{n-1} + \sum_{i=0}^{n-2} X_i 2^i =$$

$$-X_{n-1}2^{n-1} + \sum_{i=1}^{n-1} X_{n-1-i}2^{n-1-i}$$

$$Y_{tc} = -Y_{n-1}2^{n-1} + \sum_{i=0}^{n-2} Y_i 2^i =$$

$$-Y_{n-1}2^{n-1} + \sum_{i=1}^{n-1} Y_{n-1-i}2^{n-1-i}$$

Therefore, $$X_{tc} = 2^{n-1}\left[-X_{n-1} + \sum_{i=1}^{n-1} X_{n-1-i}2^{-i}\right]$$

$$Y_{tc} = 2^{n-1}\left[-Y_{n-1} + \sum_{i=1}^{n-1} Y_{n-1-i}2^{-i}\right]$$

The implication is that the non-fractional numbers $X_{tc}$ and $Y_{tc}$ can be seen as fractional with appropriate decimal point shifting and proper renaming of the bit position.

Let $$X_{tc}^* = -X_{n-1} + \sum_{i=1}^{n-1} X_{n-1-i}2^{-i}$$

$$Y_{tc}^* = -Y_{n-1} + \sum_{i=1}^{n-1} Y_{n-1-i}2^{-i}$$

$Y_{tc}^*$ with proper renaming, can be written as:

$$Y_{tc}^* = \sum_{j=1}^{m+1} W_j 2^{[(s-1)j-1]}$$

Therefore, $$X_{tc}Y_{tc} = 2^{2(n-1)}X_{tc}^* \sum_{j=1}^{m+1} W_j 2^{-[(s-1)j-1]}$$

To prove that a sign magnitude multiplier will accommodate a two's complement multiplication, it must be proven that Theorems 1, 2, 3, and 4 hold true for both multiplications. Except for shifting the decimal point, $X_{tc}$, $Y_{tc}$ and $X_{sm}$, $Y_{sm}$ have equivalent expressions if one of the two is named differently.

In hardware, this translates to forcing the operands into the registers with the LSB's at the same position, which is only a convention and not a hardware requirement. It can be easily verified that Theorem 1 holds true for both multiplications.

Thus, $\theta_j = \theta_j^* + \delta 2^{-[(n-1)+3]}$ and $\theta_{m+1} = \theta_{m+1}^*$ In order to avoid an extra row (extra partial product) and preserve the matrix, it must be shown that $W_1 \geq 0$. For sign magnitude numbers, $Y_0 = 0$, which means $W_1 \geq 0$. This is not true for two's complement notation. $Y_{n-1}$ may be either 0 or 1 and thus to preserve the matrix, $$-4Y_{n-1} + 2Y_{n-2} + Y_{n-3} + Y_{n-4} \geq 0 \quad (4.1)$$

This requires that $Y_{n-1} = Y_{n-2} = Y_{n-3} = Y_{n-4}$, which implies that in order to preserve the matrix, the first decode must be all sign bits. Theorems 2 and 3 do not hold true. This is because sign extension has been encoded and, for sign magnitude multiplication, $X_0 = 0$ (i.e., $X_{sm}$ has been forced to be positive). Thus, $S_j$ determines the sign of $\Phi_j$. This is not true for two's complement multiplication. $X_{n-1}$ may be 1 or 0. Thus, $S_j$ alone can not determine the sign bit of $\Phi_j$. The following holds true.

THEOREM 5

The sign of $\Phi_j$ for both sign magnitude and two's complement is determined by $\pi_{-2} = [X_{sign} \vee S_j] \to W(0)$ with $W(0) = 1$ if and only if $|W| = 0$ with $X_{sign}$ being equal to the most significant bit of X, and $S_j$ being the sign of $W_j$.

Proof:

It must be proven that $X_0^* \to W(0) = (X_{sign} \vee S_j) \to W(0)$, with $X_0$ being equal to the most significant bit of X, in essense, $X_{sign}$.

Case 1:

$|W| \neq 0$ implying that $\to W(0) = 1$ and $\pi_{-2} = X_{sign} \vee S_j$. Table 1 describes the computation of the sign of $\Phi_j$.

TABLE 1

| | The correction of sign of $\Phi_j$ | |
|---|---|---|
| $X_{sign}$ | $S_j$ | Sign of $\Phi_j$ |
| 0 | 0 | 0 |
| 0 | 1 | 1 |
| 1 | 0 | 1 |
| 1 | 1 | 0 |

It can be easily verified that $\pi_{-2}$ respects the computation of Table 1. Thus, $X_{sign} \vee S_j$ will compute the resulting sign of $\Phi_j$.

Case 2:

$|W|=0$ i.e., $W(0)=1$ and $\pi_{-2}=0$

From (a) $X_0 \rightarrow W(0)=0$. Thus, Theorem 5 holds true for case 2.

THEOREM 6

Theorems 2 and 3 are valid if and only if $\rightarrow S_j$ and $S_j$ are substituted with $\rightarrow\pi_{-2}$, and $\pi_{-2}$, respectively, with $\pi_{-2}=(X_{sign} \vee S_j) \rightarrow W(0)$.

Proof

For Theorem 2, the following holds true when $S_j$ is substituted by $\pi_{-j}$.

$$\Phi_j = \left[ \sum_{l=0}^{2} \rightarrow \pi_{-2} 2^{l+2} + \sum_{l=1}^{2} \pi_{-2} 2^{l+2} + \pi_{-1} 2^1 + \pi_0 2^0 + \sum_{i=1}^{n-1} \pi_i 2^{-i} + \delta 2^{-(n-1+3)} \right] 2^{-(3j-1)}$$

such that $2 \leq j \leq m$ and $\pi_{-2}=(X_{sign} \vee S_j) \rightarrow W(0)$.

Thus $$\Phi_j = [\rightarrow \pi_{-2}(2^2 + 2^3 + 2^4) + \pi_{-2}(2^4 + 2^3) + \pi_{-1} 2^1 +$$

$$\pi_0 2^0 + \sum_{i=1}^{n-1} \pi_i 2^{-i} + \delta 2^{-(n-1+3)}] 2^{-(3j-1)}$$

$$= [2^4 + 2^3 + \rightarrow [(X_{sign} VS_j) \rightarrow W(0)] 2^2 + \pi_{-1} 2^1 +$$

$$\pi_0 2^0 + \sum_{i=1}^{n-1} \pi_i 2^{-i} + \delta 2^{-(n-1+3)}] 2^{-(3j-1)}$$

Case 1:

$|W| \neq 0$, thus $W(0)=0$, implying that $\rightarrow [X_{sign} \vee S_j) \rightarrow W(0)] = \rightarrow [X_{sign} \vee S_j]$ Subcase 1: Sign Magnitude $S_j=0$, then $\rightarrow (X_{sign} \vee S_j) = \rightarrow X_{sign}$. Thus, '111' has been added in the j-th row.

$S_j=1$, then $\rightarrow (X_{sign} \vee S_j) = X_{sign}$. Thus, '110' has been added in the j-th row and Theorem 2 holds true.

Subcase 2: Two's Complement Multiplication

If $S_j=0$, then $\rightarrow (X_{sign} \vee 0) = \rightarrow X_{sign}$

If $X_{sign}=0$, then the j-th row is positive and '111' has been added.

If $X_{sign}=1$, then the j-th row is negative and '110' has been added.

If $S_j=1$, then $\rightarrow (X_{sign} \vee 1) = X_{sign}$

If $X_{sign}=0$ then the j-th row is negative and '110' has been added.

If $X_{sign}=1$ then the j-th row is positive and '111' has been added.

Therefore, Theorem 2 holds true for subcase 2.

Case 2: $|W|=0$ which implies $W(0)=1$.

Thus, $\rightarrow [(X_{sign} \vee S_j) \rightarrow W(0)] = 1$ and '111' is added which implies that Theorem 2 holds true for case 2.

For Theorem 3, the following holds true:

$$\Phi_{m+1} = \left[ \rightarrow \pi_{-2} 2^5 + \sum_{l=0}^{2} \pi_{-2} 2^{l+2} + \pi_{-1} 2^1 + \pi_0 2^0 + \sum_{i=1}^{n-1} \pi_i 2^{-i} \right] 2^{-[3(m+1)-1]}$$

Case 1:

$|W| \neq 0$ then $\rightarrow W(0)=1$, $\pi_{-2}=(X_{sign} \vee S_j)$

Subcase 1:

If $S_j=0$, then $\pi_{-2}=X_{sign}$

When the sign magnitude notation is considered, then $\pi_{-2}=0$ and '1000' has been added in front of $\Phi_{m+1}$.

For two's complement notation, either '1000' is appended to the front of $\Phi_{m+1}$ if X is positive, or '0111' if negative. Thus, Theorem 3 holds true for subcase 1.

Subcase 2:

If $S_j=1$, then $\pi_{-2}=\rightarrow X_{sign}$

For the sign magnitude notation, $\Phi_j$ is negative and '0111' has been appended in front of $\Phi_{m+1}$.

For two's complement notation, either '0111' is appended if X is positive, which also indicates $\Phi_j$ negative or '1000' if negative, which indicates $\Phi_j$ positive.

Thus, Theorem 3 holds true for subcase 2.

Case 2:

$|W|=0$, then $W(0)=1$ and $\pi_{-2}=0$ implying that '1000' has been added in all cases meaning Theorem 3 holds true for case 2.

SIGN EXTENSION ENCODING

For every $\Phi_j$ with $1 < j \leq m$, three bits must be added and computed by $\rightarrow \pi_{-2}$ and $\pi_{-2}$. Two bits are 1's and the third bit (b) is equal to:

$$(b) = \rightarrow [(X_{sign} \vee S_j) \rightarrow W(0)]$$

also for the row in which $j=m+1$, four bits must be added computed by $\pi_{-2}$, and $\pi_{-2}$ while $X_{sign}$ is known $S_j$ and $W(0)$ must be calculated. $S_j$ determines $\pi_{-2}$ and also the inversion; and also determines addition of a 'hot 1' on the previous row.

Given that W, consider 4 bits at the time, namely, $Y_{k-2}, Y_{k-1}, Y_k, Y_{k+1}$. $W<0$ if and only if $Y_{k-2}=1$ and it is not the case that $W=0$. $S_j=Y_{k-2} \rightarrow W(0)$ and $\rightarrow S_j = \rightarrow Y_{k-2} + W(0)$.

Thus (b) = = > $\rightarrow [(X_{sign} \vee Y_{k-2}) \rightarrow W(0)]$ $W=0$ if and only if $Y_{k-2}=Y_{k-1}=Y_k=Y_{k+1}$ i.e., $W(0) = (Y_{k-2} Y_{k-1} Y_k Y_{k+1}) + (\rightarrow Y_{k-2} \rightarrow Y_{k-1} \rightarrow Y_k \rightarrow Y_{k+1})$ $\rightarrow W(0) = \rightarrow [(Y_{k-2} Y_{k-1} Y_k Y_{k+1}) + (\rightarrow Y_{k-2} \rightarrow Y_{k-1} \rightarrow Y_k \rightarrow Y_{k+1})]$ (b) = = > $\rightarrow (X_{sign} \vee Y_{k-2}) + (Y_{k-2} Y_{k-1} Y_k Y_{k+1}) + (\rightarrow Y_{k-2} \rightarrow Y_{k-1} \rightarrow Y_k \rightarrow Y_{k+1})$ and $S_j = Y_{k-2} \rightarrow ((Y_{k-2} Y_{k-1} Y_k Y_{k+1}) + (\rightarrow Y_{k-2} \rightarrow Y_{k-1} \rightarrow Y_k \rightarrow Y_{k+1}))$

AN ALTERNATIVE ENCODING

It can be observed that a partial product with $W=0$ can be represented in two different ways since their sums are equal:

$$\begin{array}{r} +0 \\ \underline{111000 \ldots \ldots 000} \\ 111000 \ldots \ldots 000 \end{array} \quad (a)$$

-continued

```
              +1
110111...   ...111
_____
111000...   ...000
```
(b)

The previous discussed version used encoding (a); for completeness and to show a reduction in control logic an equivalent method which uses both versions (a) and (b) is shown. If both versions are assumed, then the following holds true:

$\pi_{-2} = ((X_{sign} \text{ W}(0)) \vee S_j)$ with $S_j = Y_{(k-(s-2))}$ and $S_{j+1} = Y_{(k+1)}$ and $X_i^* = X_i$ if $Y_{(k-(s-2))} = 0$ or $X_i^* = X_i$ if $Y_{(k-(s-2))} = 1$ and $\delta = 0$ if $Y_{k+1} = 0$, or $\delta = 1$ if $Y_{k+1} = 1$, If W does not equal 0, then as proven previously, $\pi_{-2} = (X_{sign} \vee Y_{(k-(s-2))})$ will compute the right encoding.

If $W = 0$, then $\pi_{-2} = Y_{(k-(s-2))}$ and $S_j = Y_{(k-(s-2))}$. If $Y_{(k-(s-2))} = 0$, then both the previously discussed encoding and this encoding give version (a)'s representation of $W = 0$. If $Y_{(k-(s-2))} = 1$, then the previous encoding yields (a) and this encoding gives (b)'s representation of $W = 0$. Since both are equivalent, this encoding is valid. Thus, for the given $1 < j \leq m$, the encoding is valid. For $j = m+1$, the following encodings are used which are equivalent.

```
left encode Xi* right encode
|---|              +0
1000000...     ...000
_____
1000000...     ...000
```
(c)

```
left encode Xi* right encode
|---|              +1
0111111...     ...111
_____
1000000...     ...000
```
(d)

Version (c) is used in the previous discussed method and both are used in the alternative method depending on $Y_{(k-(s-2))}$. Thus, an alternative method of encoding the partial products has been discussed which uses less hardware. For more details on this see the figures and diagrams in the attachment.

THEOREM 7

$X_{sm}Y_{sm}$ and $X_{tc}Y_{tc}$ are equivalent to a matrix P, where:

$$P = \Phi_1 + \sum_{j=2}^{m} \Phi_j + \Phi_{m+1}$$

such that $\Phi_1$ is guaranteed to be positive and equal to $$\Phi_1 = \left[ \sum_{i=1}^{n} \pi_i 2^{-i} + \delta 2^{-[(n-1)+3]} \right] 2^{-2}$$

and $$\Phi_j = \left[ \sum_{l=0}^{2} \rightarrow \pi_{-2} 2^{l+2} + \sum_{l=1}^{2} \pi_{-2} 2^{l+2} + \pi_{-1} 2^{1} + \pi_0 2^{0} + \right.$$

$$\left. \sum_{i=1}^{n-1} \pi_i 2^{-i} + \delta 2^{-(n-1+3)} \right] 2^{-(3j-1)},$$

-continued $$\Phi_{m+1} = \left[ \rightarrow \pi_{-2} 2^{5} + \sum_{l=0}^{2} \pi_{-2} 2^{l+2} + \pi_{-1} 2^{1} + \right.$$

$$\left. \pi_0 2^{0} = \sum_{i=1}^{n-1} \pi_i 2^{-i} \right] 2^{-[3(m+1)-1]}$$

and such that for every $\Phi_j$, $\pi_{-1}$, $\pi_0$ and $\pi_i$ equal to the corresponding bit of X or its inversion depending on $S_j$ corresponding to the row.

Thus $S_j = Y_{k-2} \rightarrow W(0)$ for any given j and $\delta = 1$ if and only if $S_{j+1} = 1$, $\pi_{-2} = (X_{sign} \vee Y_{k-2}) \rightarrow W(0)$ where $X_{sign}$ is the most significant bit of X, and $\rightarrow W(0)$ is computed by $\rightarrow((Y_{k-2}Y_{k-1}Y_kY_{k+1}) + (\rightarrow Y_{k-2} \rightarrow Y_{k-1} \rightarrow Y_k \rightarrow Y_{k+1}))$.

Now,
$S_j = Y_{k-2} \rightarrow W(0) = Y_{k-2} \rightarrow (Y_{k-2}Y_{k-1}Y_kY_{k+1} + \rightarrow Y_{k-2} \rightarrow Y_{k-1} \rightarrow Y_k \rightarrow Y_{k+1})$, where $Y_{k-2}$, $Y_{k-1}$, $Y_k$ and $Y_{k+1}$ are the four bits of Y considered by the j-th scan, with $Y_{k-2}$ being the first bit, $Y_{k-1}$, the second, $Y_k$, the third, and $Y_{k+1}$, and the fourth bit of the scan or with $S_j$, $\pi_{-2}$ alternatively produced by $S_j = Y_{k-2}$, $\pi_{-2} = (X_{sign} \rightarrow W(0)) \vee Y_{k-2}$.

Proof:

Trivial from theorems 4, 5, and 6, and the alternative encoding.

HARDWARE IMPLEMENTATION

Assuming the design of a sign magnitude multiplication given in "A Two's Complement Parallel Array Multiplication Algorithm" by Bough et al., IEEE TRANSACTIONS ON COMPUTERS, Vol. C-22, Pg. 1045-1047, Dec. 1973, the changes needed to accommodate both two's complement and sign magnitude multiplication on the same multiplier are now considered. Based on the previous theorems and observations, the following can be stated:

1. Place the two operand's bits properly. i.e., for both two's complement and sign magnitude, the Least Significant Bits should be at the same positions. Hardware and time cost nothing.
2. $X_{tc}$ and $Y_{tc}$ must be properly sign-extended, which means that multiplexing is necessary when placing operands. Hardware addition is 10 buffers for repowering due to 32 and 48 fanouts from sign bit of X and Y multiplexor, respectively.
3. Proper calculation of 3X. One OR and one XOR (exclusive-OR) are needed as an extra.
4. Scan the j-th row.
5. Compute $S_j$ properly.
6. Create $\Phi_j$ and $\Phi_{m+1}$.
7. Create the sign extension encoding using $\pi_{-2}$ instead of $S_j$. It costs 18 more XORs.
8. For the last row, it costs 6 cells more by changing the AND to an XOR.
9. For the cycle synchronization with other data, latches for sign extension will be added at XREGB and YREG, which adds 3 latches more.

THE GENERALIZED ALGORITHM

As proven in [4], $|W_j| \leq 2^{(s-2)}$. Thus, $s-2+n-1$ bits are needed to represent $S_jX_{sm}|W_j|$. Then, there is $\Phi_j^*$ such that it will represent $S_jX_{sm}|W_j|$ with a possible 'hot 1' added.

The incorporated patent application dictates the number of bits to be added in order to encode the sign extension, namely, s−1 for all the rows except for the last row that needs s.

Guarantee the first row is positive by having a first scan of s−1 sign extension extra bits for every scan $1 < j \leq m$ must be computed by $\pi_{-2} = (X_{sign} \vee S_j) \rightarrow W(0)$ so as to add s−1 one's if $\Phi_j \geq 0$ and s−2 one's followed by a zero if $\Phi_j < 0$. Also, $\pi_{-2}$ will compute the s bits properly so that if $\Phi_{m+1} \geq 0$, then a '0' will be added followed by s−1 'one's. Or if $\Phi_{m+1} < 0$, then a '1' will be added followed by s−1 'zero's.

Using these theorems, an algorithm for forming the matrix is formulated. One first assumes s-bit overlapped scanning with m+1 partial products, m being =INT[(n−1/(s−1)], with INT being the integer division, and n the length of the multiplier Y. The value of s may be determined after conducting a comparative study of the hardware and timing requirements of an application to calculate the multiples with due consideration of the adding circuitry.

In the explanation to follow, it is assumed, for the purposes of illustration, that n=57 and s=4. In this case, m+1=19. None of these values are intended to, and should not, limit the teachings of this description. In fact, the ranges of n, s, and m are limited only by design considerations and the relationships established above.

Figure 6:
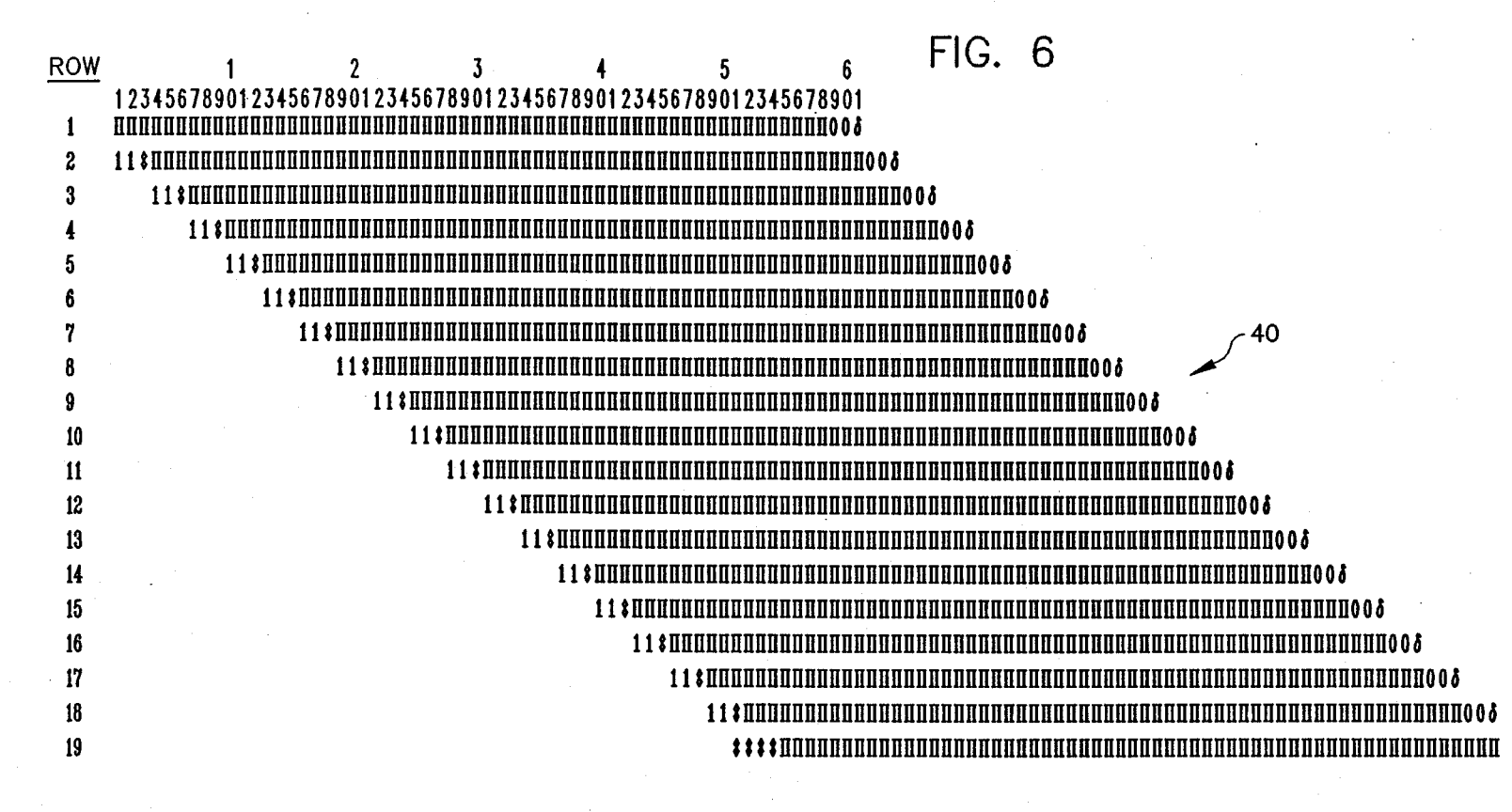

Referring to FIG. 6, the matrix of the embodiment is illustrated. Assuming that scanning starts at the most significant bits of Y, that is, partial product is shifted with respect to the j-th partial product by 3(=s−1) bits to the right, where i is an integer, $\geq 1$ and $\geq m+1$. As illustrated in FIG. 6, where the successive partial products 1-19 are shown as rows of the matrix, each row, save the first two, is shifted to the right by 3(=s−1) bits relative to the previous row. Each partial product includes the product of partial multiplication indicated by $\pi$ signs. In addition, each partial product has appended sign encoding bits. The first partial product has the sign encoding bits appended at its right-hand end, the last partial product has sign encoding bits appended at its left-hand end, all of the middle partial products have sign encoding bits appended at right and left ends.

As FIG. 6 shows, the first partial product has 61 bits, the middle partial products (the second through the eighteenth) have 64 bits, and the last partial product, the nineteenth, has 62 bits. The $\pi$ sign represents a significant unknown bit of a partial product. The * represents a significant unknown bit which is in a partial product's matrix for sign magnitude and two's complement multiplication, but which is computed differently for the two forms, as described above. The values 1 and 0 represent known significant bits of the partial product rows. Last, the $\delta$ sign represents a significant unknown bit of a row specifically for the encoding of a "hot 1" as described above. Out of the 1,211 bits that make up the matrix, only 21 (all indicated by *) are encoded based upon the form of the operands.

The first row of the matrix of FIG. 6 is illustrated in FIG. 7A. This row is produced by scanning the operand X with the first multiplier bit group illustrated in FIG. 7B. As shown, the first row is 61 bits wide, with the three last bits being the right encode of "00δ" where δ, equal to $Y_3$, is the "pseudo-sign" of the next partial product. The bits of the row are labeled −1 through 56, where −1 and 0 are bits resulting from the operand X being multiplied by $2^{(s-2)}$ or $2^2$. There are no terms denoted by *, implying that this partial product is the same for sign magnitude operands as for two's complement operand.

The equations for determining the bits of the first partial product are given by equations (A1)-(A4):

$$\pi(-1) = (X_{(1)}W[4] + 3X_{(1)}W[3] + X_{(0)}W[2] + X_{(0)}W[-1]) \text{ for } i = -1 \quad \text{(A1)}$$

$$\pi(0) = (X_{(2)}W[4] + 3X_{(2)}W[3] + X_{(1)}W[2] + X_{(0)}W[1]) \text{ for } i = 0 \quad \text{(A2)}$$

$$\pi(i) = (X_{(i+2)}W[4] + 3X_{(i+2)}W[3] + X_{(i+1)}W[2] + X_{(i)}W[1]) \text{ for } i = 1 \text{ to } 56 \quad \text{(A3)}$$

wherein the coefficients are given by equations (C0)-(C4):

$$W[0] = (Y_{(k-2)}Y_{(k-1)}Y_{(k)}Y_{(k+1)}) + (\rightarrow Y_{(k-2)} \rightarrow Y_{(k-1)} \rightarrow Y_{(k)} \rightarrow Y_{(k+1)}) \quad \text{(C0)}$$

$$W[1] = (Y_{(k-2)}Y_{(k-1)} + \rightarrow Y_{(k-2)} \rightarrow Y_{(k-1)})(Y_{(k)} \rightarrow Y_{(k+1)} + \rightarrow Y_{(k)}Y_{(k+1)}) \quad \text{(C1)}$$

$$W[2] = (\rightarrow Y_{(k-1)}Y_{(k)}Y_{(k+1)}) + (Y_{(k-1)} \rightarrow Y_{(k)} \rightarrow Y_{(k+1)}) \quad \text{(C2)}$$

$$W[3] = (\rightarrow Y_{(k-2)}Y_{(k-1)} + Y_{(k-2)} \rightarrow Y_{(k-1)})(Y_{(k)} \rightarrow Y_{(k+1)} + \rightarrow Y_{(k)}Y_{(k+1)}) \quad \text{(C3)}$$

$$W[4] = (\rightarrow Y_{(k-2)} \rightarrow Y_{(k-1)}Y_{(k)}Y_{(k+1)}) + (Y_{(k-2)} \rightarrow Y_{(k-1)} \rightarrow Y_{(k)} \rightarrow Y_{(k+1)}) \quad \text{(C4)}$$

FIGS. 8A and 8B illustrate the j-th partial product for $2 \leq j \leq 18$. These rows each have 64 bits, including three sign encoding bits on each end. In FIG. 8A, the left hand bits="11*", where * denotes the bit that is determined differently for signed magnitude operands than for two's complement operands. The three right-hand bits add a "hot 1" to the j+1 partial product when necessary and are labeled "00δ" where $\delta = Y_{(k+1)}$. The bits of jth partial product are labeled −1 to 56, and −4−3−2 for the left-hand encoding. FIG. 8B shows how the multiplier Y is scanned to produce the j-th partial product. In FIG. 8B, four consecutive multiplier bits $Y_{(k-2)}$–$Y_{(k+1)}$ scan the multiplicand X to produce the j-th partial product, with the multiplier bit group for scanning the (j+1th) partial product overlapping the bit group of FIG. 8B by 1 bit, $Y_{(k+1)}$. The equations for determining the bits of the j-th partial product are given by equations D(1)–D(7):

$$\pi(-4) = 1 \tag{D1}$$

$$\pi(-3) = 1 \tag{D2}$$

$$\pi(-2) = \neg(Y_{(k-2)} \vee (X_{(0)} \to W[0])) \tag{D3}$$

$$\pi(-1) = Y_{(k-2)} \vee (X_{(1)}W[4] + 3X_{(1)}W[3] + X_{(0)}W[2] + X_{(0)}W[1]) \text{ for } i = -1 \tag{D4}$$

$$\pi(0) = Y_{(k-2)} \vee (X_{(2)}W[4] + 3X_{(2)}W[3] + X_{(1)}W[2] + X_{(0)}W[1]) \text{ for } i = 0 \tag{D5}$$

$$\pi(i) = Y_{(k-2)} \vee (X_{(i+2)}W[4] + 3X_{(i+2)}W[3] + X_{(i+1)}W[2] + X_{(i)}W[1]) \text{ for } i = 1 \text{ to } 56 \tag{D6}$$

$$\delta = Y_{(k+1)} \tag{D7}$$

It will be observed that determination of bit $\pi(-2)$ for the j-th row is an exclusive-or (XOR) term. In view of the discussion above regarding Theorem 7, it will be appreciated that, if the FIG. 1 multiplier were limited to sign magnitude operands, the right-hand side of equation (D3) would include only $Y_{(k-2)}$. However, in order to accommodate both sign magnitude and signed binary operands, this bit is determined according to equation (D3). Thus, sign encoding the jth row depends upon bit $Y_{(k-2)}$, drawn from the jth multiplier bit group, or upon the sign bit $X_0$ of the multiplicand.

Figure 9A:
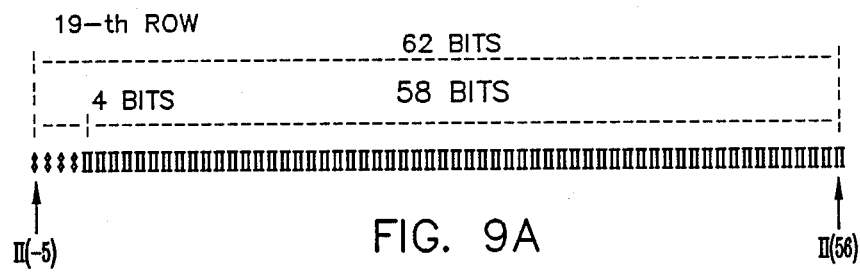
Figure 9B:
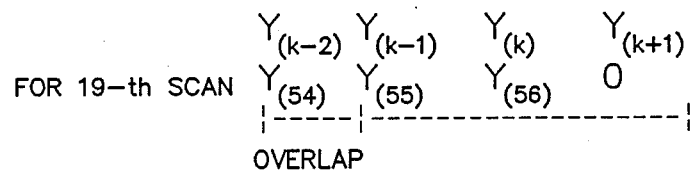

FIG. 9A illustrates 19-th partial product, included in the last row of the matrix. As shown, there is no right encoding, there being no subsequent matrix row, and thus no requirement to possibly encode a "hot 1". The left-side encoding includes four bits, $\pi(-5)$–$\pi(-2)$. The equations for the bits of the 19-th row are given by:

$$\pi(-5) = \neg(Y_{(54)} \vee (X_{(0)} \to W[0])) \tag{E1}$$

$$\pi(-4) = (Y_{(54)} \vee (X_{(0)} \to W[0])) \tag{E2}$$

$$\pi(-3) = (Y_{(54)} \vee (X_{(0)} \to W[0])) \tag{E3}$$

$$\pi(-2) = (Y_{(54)} \vee (X_{(0)} \to W[0])) \tag{E4}$$

$$\pi(-1) = Y_{(54)} \vee (X_{(1)}W[4] + 3X_{(1)}W[3] + X_{(0)}W[2] + X_{(0)}W[1]) \text{ for } i = -1 \tag{E5}$$

$$\pi(0) = Y_{(54)} \vee (X_{(2)}W[4] + 3X_{(2)}W[3] + X_{(1)}W[2] + X_{(0)}W[1]) \text{ for } i = 0 \tag{E6}$$

$$\pi(i) = Y_{(54)} \vee (X_{(i+2)}W[4] + 3X_{(i+2)}W[3] + X_{(i+1)}W[2] + X_{(i)}W[1]) \text{ for } i = 1 \text{ to } 56 \tag{E7}$$

As equations (E1)–(E4) show, the FIG. 1 multiplier accommodates both sign magnitude operands and signed binary operands in complemented form by exclusive-ORing the first bit, $Y_{54}$, of the 19-th multiplier bit group with an expression including the sign bit $X_0$ of the multiplicand operand.

Thus, the matrix for 4-bit overlapped scanning of a 57-bit multiplicand has been shown in detail. As FIG. 6 illustrates, the middle 17 rows of the matrix are each offset by s−1 bits from the preceding matrix row, except for the second row, which is not offset from the first. The last row is offset from the penultimate row by s−2 bits. It will be evident to those skilled in the art that the equations given above for matrix rows can be generalized to the case of a multiplicand having n−1 bits, not counting the sign bit, in which each partial product includes at most ((n−1)+(s−2)) bits, with the right and left end encodes for the middle partial products being s−1 bits each. Further, the second row through the next to last row are right-offset by s−1 bits.

The entire matrix in the general case is 2(n−1) wide and has m+1 partial products. The first row of the general matrix will contain ((n−1)+(s−2)+(s−1)) bits, the first ((n−1)+(s−2)) bits being the partial product, with s−1 bits appended on the right end. The appended bits consist of s−2 0's followed by a δ which is the "hot 1" for the second partial product, and which is determined by $Y_{(s-1)}$. In this case, $Y_0$ is the most significant bit, and is also the sign bit, for the sign magnitude multiplier, while $Y_0$ through $Y_{s-1}$ are all equal to the sign bit for a complemented binary multiplier.

For the j-th row of the general case, where $2 \leq j \leq m$, each row is ((n−1)+(s−2)+2(s−1)) bits wide, with ((n−1)+(s−2)) bits representing the partial product, and s−1 sign encoding bits appended on the left- and right-ends of each row to encode sign extension and the possibility of a "hot 1" respectively. Each left-sign encoding consists of s−2 ones, followed by *. These bits are labeled (−(2s−4)) through (−(s−2)). The right encode includes s−2 0's followed by a $\delta = Y_{k+1}$. The partial product has bits at positions (−(s−3)) through (n−1).

Last, the (m+1)th, the last, row of the partial product matrix in the general case has ((n−1)+(s−2)+s) bits. In this row, n−1+s−2 bits are needed to represent the partial product, and s bits are appended on the left end of the partial product. The s encoding bits are all denoted by *.

Figure 10:
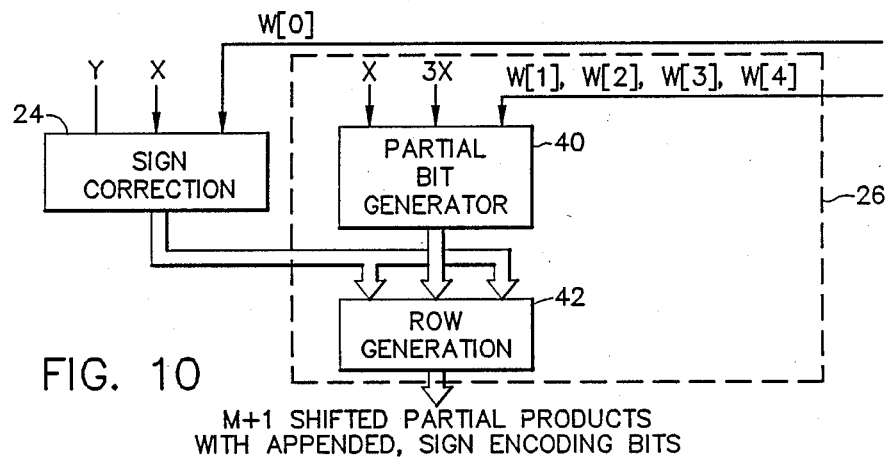
FIG. 10 is a schematic circuit diagram illustrating a matrix assembler of the invention.

With the matrix thus explained, provision for generating it can be understood with reference now to FIGS. 10–17, in which an example using 4-bit overlapped scanning will be presented. In FIG. 10, the matrix assembler 26 is shown in greater detail, and includes a partial bit generator 40 and row generation circuitry 42. The partial bit generator 40 can be appreciated with reference to equation (A1)–(A3), (D4)–(D6), and (E5)–(E7). These equations are for generating partial product bits $\pi(-1)$–$\pi(i)$ for the rows of the matrix of FIG. 6. The partial bit generator 40 combines X, 3X and W[1]–W[4] as required for these equations. The row generation circuitry 42 combines the generated terms with $Y_{k-2}$ to produce the partial product bits for the middle and last rows of the matrix, and also cooperates with the sign encoder to append the sign encoding bits, as required, by combining $Y_{k-2}$, $X_0$, and W[0]. The row generation circuitry 42 produces the sequence of m+1 shifted partial products with appended sign-encoding bits as illustrated above in FIGS. 6–9B.

Figure 11:
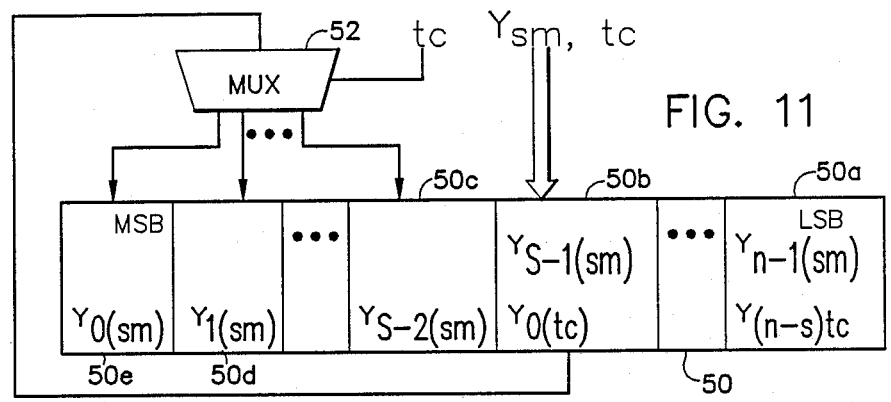
FIGS. 11 and 12 are schematic circuit diagrams illustrating means for aligning and sign-extending two's complement operands.
Figure 12:
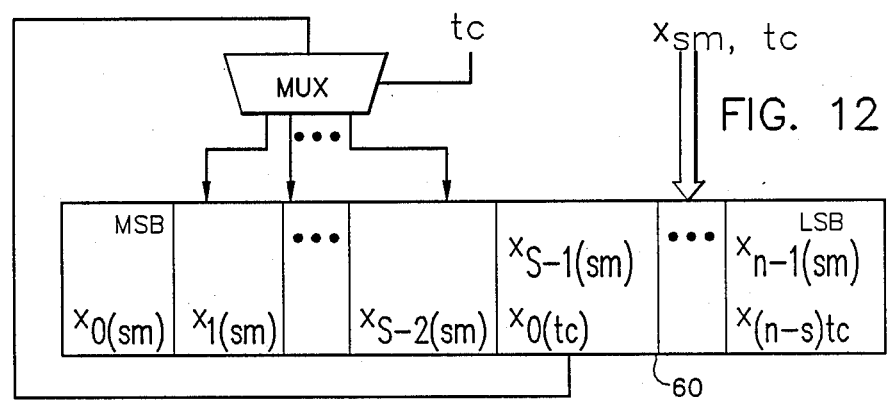
Figure 13A:
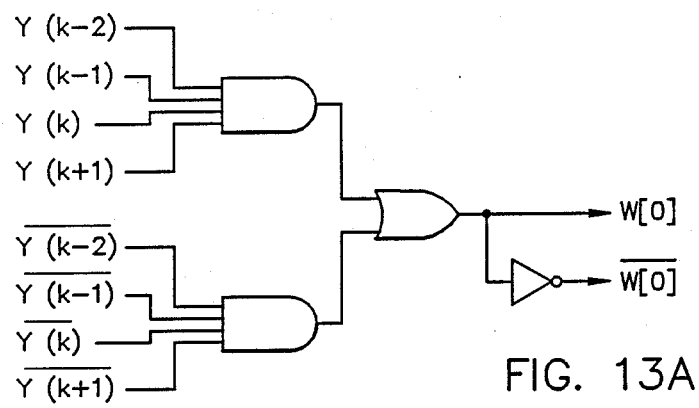
Figure 13B:
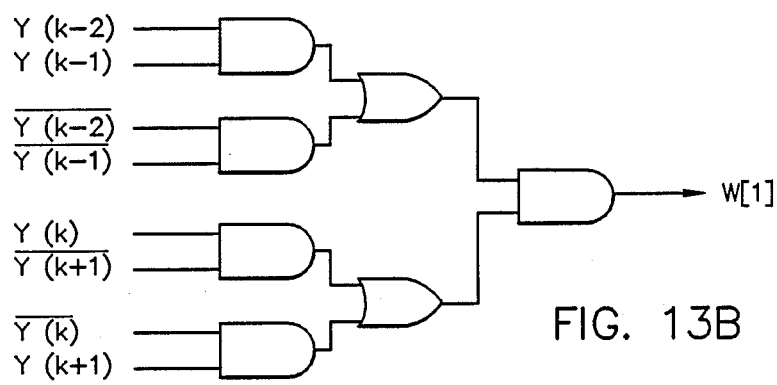
Figure 13C:
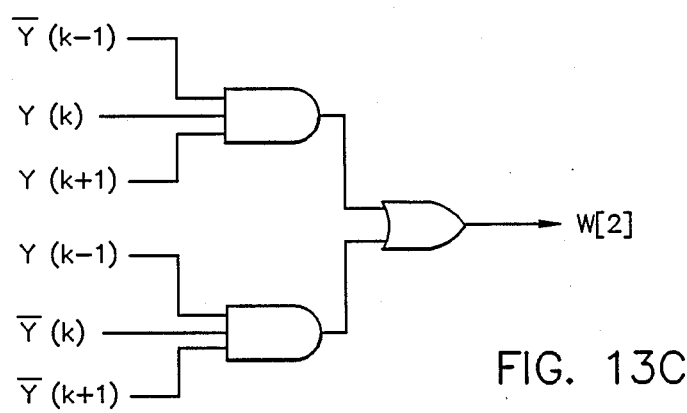

Prior to matrix assembly, operands are aligned and extended, if necessary, as illustrated in FIGS. 11 and 12. In FIG. 11, a register 50 includes end storage spaces for storing a sign magnitude multiplier of n bits, $Y_0$-$Y_{n-1}$, as described above. Bit $Y_0$ is both the sign bit and MSB of the sign magnitude multiplier, while bit $Y_{n-1}$ is the LSB of the multiplier. A signed binary multiplier in two's complement form, $Y_{tc}$, is constrained to include $n-(s-1)$ bits. These bits extend from bit $Y_0$ through bit $Y_{n-s}$tc, from most to least significant, bit $Y_0$ being the sign bit. In the practice of the invention, in order to ensure that the first partial product magnitude is all zeros, $s-1$ bits are appended on the front of a signed binary multiplier, the bits being replications of the sign bit $Y_0$. This is accomplished by, for example, placing the signed binary multiplier in the $n-(s-1)$ least significant bit positions of the register 50, and multiplexing $Y_0$ with multiplexer 52 into the first $s-1$ bit positions of the register 50. In this case, the multiplexer 52 multiplexes the sign bit of a signed complement multiplier into the first $s-1$ bits of the register 50 only in response to a signal tc indicating, for example, a two's complement multiplier.

Inspection of FIG. 12 will reveal that a signed binary multiplicand $X_{tc}$ is aligned with a sign magnitude multiplicand by being entered into the least significant bits of a register 60, with the sign bit being multiplexed through a multiplexer 62 into the $s-1$ most significant bits in response to the tc signal. Otherwise, if X is a sign magnitude operand, it is entered into the register 60 in order from most to least significant bits.

The combining circuit 22 which produces the coefficients W[0]-W[4] is illustrated in detail in FIGS. 13A-13E, which embody equations (C0)-(C4), respectively. As shown, the coefficients are generated in response to the bits of the current multiplier bit group which is scanning the multiplicand to produce the current matrix row.

The partial bit generator is illustrated in FIG. 14. In FIG. 14, 58 circuits are connected in parallel and respond to values of X and to the coefficients W[1]-W[4]. Each of the circuits a generates partial bit which is used to generate one of the 58 partial product bits for each row of the matrix in FIG. 6. Thus, the circuit consisting of AND gates 70-73 and OR gate 74 combines $X_1$, $3X_1$, $X_0$, and the four coefficients W[1]-W[4] to produce a partial bit for $\pi(-1)$ in a partial product. Partial bit 0 is generated by four AND gates 80-83 which are connected to the OR gate 84 to combine $X_0$, $X_1$, $3X_2$, and $X_2$ with the four coefficients. Partial bit $\pi(i)$ is produced by circuit consisting of the four AND gates 90-93, and the OR gate 94, which are connected to combine the four coefficients with $X_i$, $X_{i+1}$, $3X_{i+2}$, and $X_{i+2}$.

Returning to the circuit for partial bit ($-1$), each of the AND gates 70-73 is a two-input, single-output gate, with each output connected to a respetive input of the OR gate 74. AND gate 70 combines $X_1$ with W[4], the gate 71 combines $3X_1$ with W[3], the AND gate 72 combines $X_0$ with W[2], while the AND gate 73 combines $X_0$ with W[1]. Inspection of equation (A1) will confirm that the first partial bit circuit indeed produces bit $\pi(-1)$ for the first partial product. Inspection of equations (D4) and (E5) will confirm that the first partial bit circuit produces the term which is exclusive-ORd with $Y_{k-2}$. Similarly, the remaining partial bit circuits produce bits $\pi(0)$ and $\pi(i)$ for the first partial product as required by equations (A2) and (A3). For the middle and last rows of the matrix of FIG. 6, the remaining partial bit circuits produce a term which is exclusive-ORd with $Y_{k-2}$. Thus, during the first scan of multiplicand, the partial bit circuit of FIG. 14 produces the partial product forming the first row of the matrix of FIG. 6. For the remaining scans, the partial bit circuit produces values which are exclusive-ORd with one of the bits of the multiplier group currently scanning to produce partial product bits.

Figure 15:
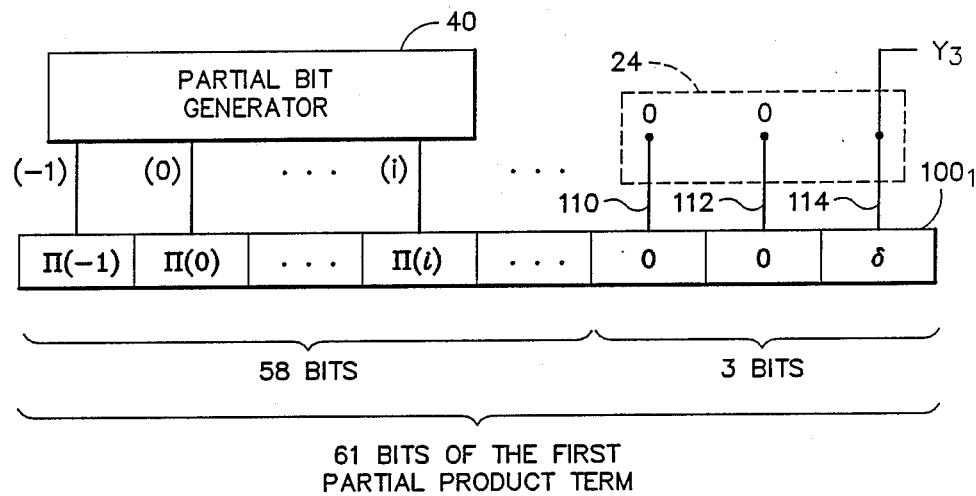
FIGS. 15–17 are circuit schematic diagrams illustrating row generation circuitry used to generate partial products in the embodiment of the invention.

FIG. 15 illustrates the portion of the matrix assembler 26 which assembles the first row of the matrix of FIG. 6. The outputs of the partial bits generator 40 are fed directly to a storage location for the first partial product row, the storage location being illustrated by a register $100_{(1)}$. The first 58 bits of the register $100_{(1)}$ receive directly the bits output by the partial bit generator 40 in their significance sequence. In this regard, their significance sequence is $\pi(-1)\pi(0) \ldots \pi(i)$, the sequence given by equation (7.1). The manner in which the sign encoding circuit 24 operates to append boundary bits on the right end of the first partial product term is also shown in FIG. 15. As already described, for the first partial product, $S-1$ bits are appended to the right end of the partial product term. These bits are all zeros, if the following partial product is positive. If, however, the following partial product is negative, the bits appended to the right of the first partial product are $S-2$ zeros, followed by a 1. Since the sign of the next row, as proven above, is given by $Y_{k+1}$, (for the first row, $Y_3$), the sign encoding circuit 24 in FIG. 15 includes bit lines 110, 112, and 114 feeding the last 3 bit locations in storage location 100(1). The bit lines 110 and 112 are hardwired to a logic level "0", while the bit line 114 is responsive to the value of $Y_3$. Thus, when $Y_3$ is at logic level "0", the sign value for the first row will be 0, which indicates that the next row is positive. If, on the other hand, $Y_3$ is 1, the value of delta will be 1, indicating that the sign of the next matrix row is negative.

Figure 16:
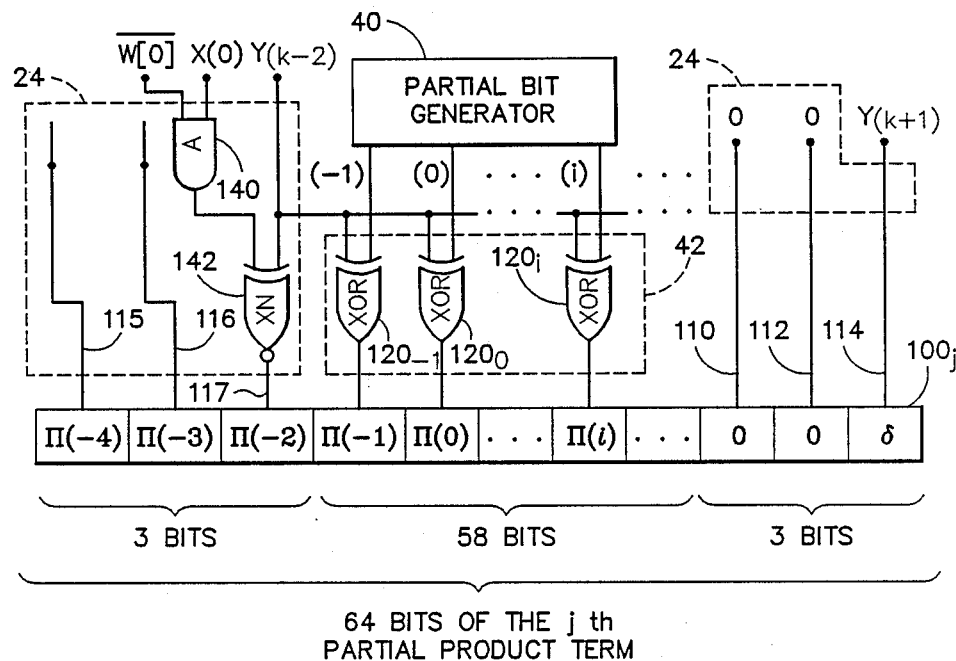

FIG. 16 illustrates the generation of matrix rows 2 through m according to the invention. In FIG. 16, the partial bit generator 40 is connected to the row generator circuit 42. The row generator circuit consists of exclusive-or (XOR) gates $120_{-1}$-$120_i$. Each of the XOR gates receives as inputs a respective partial bit from the partial bit generator 40 and multiplier bit group bit $Y_{k-2}$. The outputs of the XOR gates of the row generator circuit are connected to respective bit cells of a register $100_{(j)}$ representing a storage location for matrix row j. It will be appreciated that the 58 bits of the partial product in the j-th row of the matrix will be in the significance sequence from $\pi(-1)$ through $\pi(i)$. The $s-1$ bits are appended to the right end of the partial product of the j-th row are generated by the sign encoding circuit 24 as described above in connection with FIG. 15. The $s-1$ bits appended to the left hand end of the partial product are generated in the sign encoding circuit 24 as illustrated in FIG. 16. In this regard, three sign encoding bits are generated for appending to the left end of the j-th partial product, since s=4. If the partial product term is positive, the encoding is $s-1$ 1's; and if negative, the encoding is $s-2$ 1's followed by a 0. In FIG. 16, lines 115 and 116 are permanently hardwired to a logic "1". Bit line 117 is connected to the output of exclusive-nor (XN) gate 142. The inputs to the XN gate 142 are $Y_{k-2}$ and the output of the AND gate 140, which combines $X_0$ with $\rightarrow$W[0]. Thus, the j-th row of the matrix conforms to the illustration given by equation (7.2).

Figure 17:
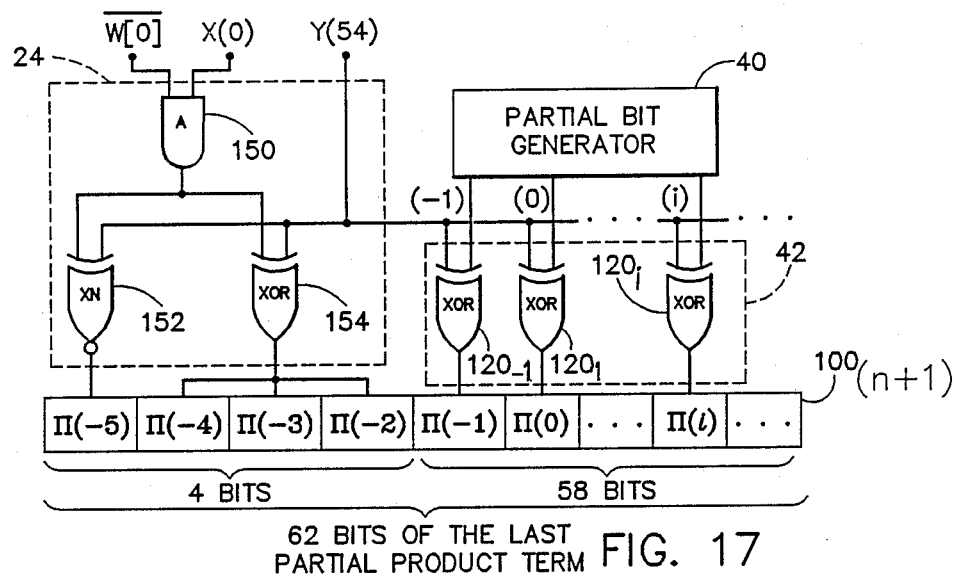

Formation of the (m+1)-th row of the FIG. 6 matrix is illustrated in FIG. 17. In FIG. 17, a register $100_{(m+1)}$ illustrates a storage location where the last row of the matrix is stored. The fifty-eight bits comprising the row's partial product are generated as in FIG. 16 by the partial bit generator 40 and the row generator 42. In the case of the last row, s encoding bits are appended to the left end of the partial product to complete the row. In this regard, s=4, and the four bits are $\pi(-5)$ through $\pi(-2)$. For $\pi(-5)$, the XN gate 152 combines $Y_{54}$ (which is $Y_{k-2}$ for the last multiplier bit group), with the output of AND gate 150 combining $X_0$ and →W [0]. The combination of AND gate 150 and XOR gate 154 satisfies each of equations (E2)–(E4). Thus, it will be evident that either "0111" or "1000" will be appended onto the left end of partial product m+1, as provided in the discussion of alternative sign encoding above.

For the case of this embodiment, in which s=4, n−1=56, and m+1=19, the derivation of the matrix of FIG. 6 will be described. Each row of the matrix of FIG. 6 is produced by scanning the multiplicand X with one of a sequence of overlapping bit groups of the multiplier Y. The first partial product is obtained by scanning the multiplicand with bits $Y_0$ through $Y_3$, the second scan entails bits $Y_3$ through $Y_6$, and so on. With this division of the multiplier Y, there are 19 scans, and hence, 19 partial products are produced.

In creation of the matrix, the partial product terms in all rows, except the first and last, are appended with s−1 bits at each end to make them uniform in length and displacement. The appending also "bands" the matrix. Each partial product is represented as 58 bits which is n−1+s−2. Negative partial products are effectively rendered in one's complement, with a "hot 1" added by appending the previous partial product to give the two's complement. Thus, s−1 bits are added to the right of every partial product, save the last, to account for representing the negative products as one's complement numbers, rather than two's complement numbers. If partial product j is negative, its representation is in one's complement. Appending 001 to the right of the one's complemented (j−1)th partial product and aligned with $\pi(n-1)$ of the jth row will render partial product j in two's complement form when the partial products are added. Of course, 000 is appended to the right of each partial product in a row preceeding a positive partial product.

Last, three bits are appended to the left of every middle partial product. This is done to extend the sign of any negative partial products. These three bits are 111 for positive partial product and 110 for negative. The last partial product has an s-bit encoding appended to the left-hand end which is 0111, denoting that the product is negative or 1000 if the product is positive.

Thus, the overlapped, banded scanning matrix is formed with first row having 61 significant bits, the next 17 rows having 64 significant bits, and the last row having 62 significant bits. Each row of the matrix is shifted 3 bit positions to the right with respect to the preceeding row. Since the partial product in the first row has no 3 bit sign extension on the left, the first and second rows begin in the same column. Because the last row has no bit extension on the right, the last and next to last rows end in the same column. Also, since the last row is extended 4 bits on the left row, the last row begins 2 bit positions to the right of the penultimate row.

This matrix can be reduced to a product using carry save adder tree technology. For example, the carry save adder tree of FIG. 18 includes 17 carry-save adders, CSA1–CSA17. This adder structure requires division of the matrix of FIG. 6 into 6 sets of three rows plus a 7th set having one row. The first 6 sets, for example, rows 1–18 are then processed in the first stages CSA1–CSA6 of the carry save adder tree. In the second stage of the tree, a reduced matrix of partial product terms is combined. The designations C1, S1, C2, S2, C3, S3, C4, S4, C5, S5, C6, and S6 indicate the respective carry and sum outputs from the carry save adders of the first stage of the tree of FIG. 3. There are now 4 sets of 3 rows each, which are added in the second stage of the tree comprising CSA7–CSA10.

The third stage of the carry save adder tree adds the reduced matrix obtained from the second stage, which now includes three sets of three matrix rows, the last set including the last row of the original matrix which is added in CSA13.

Figure 18:
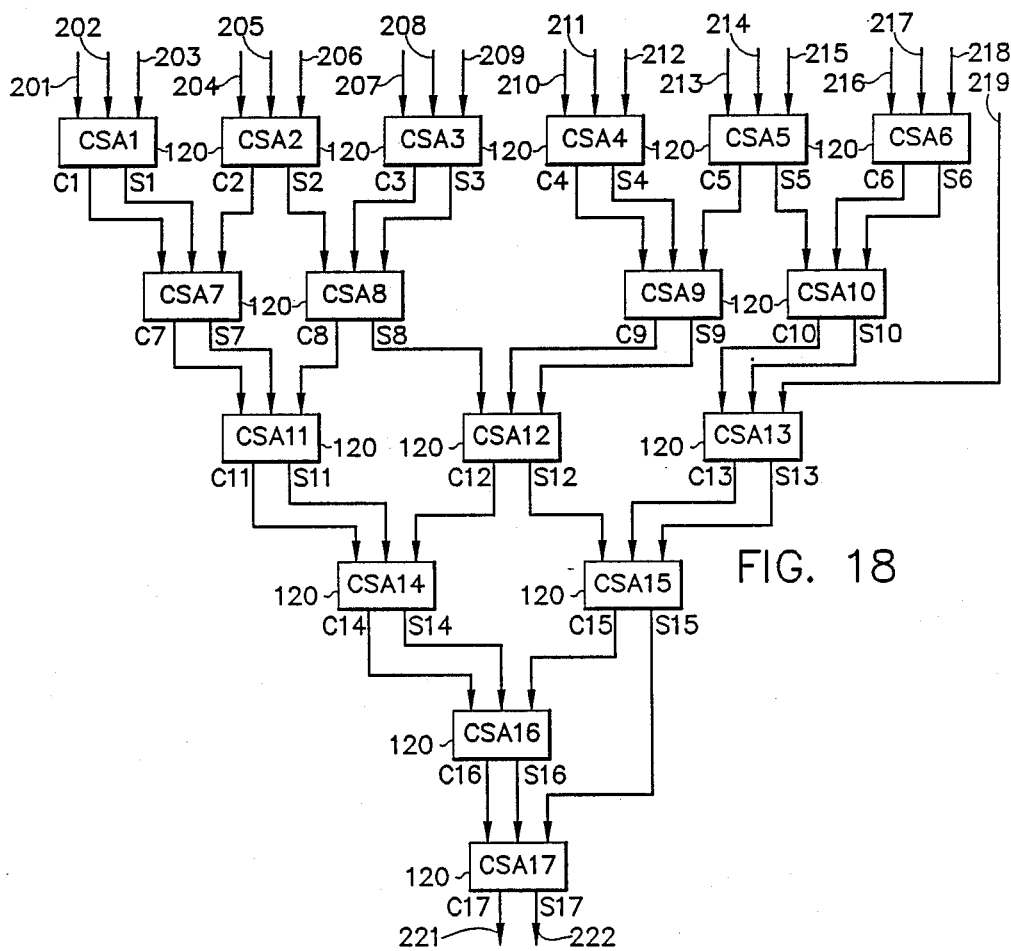
FIG. 18 is a block diagram illustrating a carry-save adder tree for adding the partial product matrix.

The fourth stage of the carry save adder tree adds a further reduced matrix including two sets of three rows each. The first set is added in CSA14, and the second in CSA15. The fifth stage of the carry save adder, consisting of CSA16, now must add only a single set of three inputs, C14, S14, and C15. An extra row derived from output S15 is saved for the 6th stage of the tree as shown in FIG. 18. The final three rows of partial product terms of the matrix are added in carry save adder CSA17.

Returning to FIG. 1, the register 32, placed at the output of the carry save add circuit 30 and before 2-input adder 34 stores the two reduced matrix rows output by CSA17, which are provided to the adder 34 to produce the product resulting from multiplication of the operands X and Y.

NOTATION:

In this description, the following notation is observed:
$X_{sm}$: sign magnitude representation of multiplicand X
$Y_{sm}$: sign magnitude representation of multiplier Y
$X_{tc}$: two's complement representation of X
$X_{tc}$: two's complement representation of Y
$\Sigma$: summation
Y: exclusive —OR of terms
→: complementation of a term or a bit
+: logical OR of terms
the logical AND of terms is denoted by juxtaposition.

Obviously, many modifications and variations of the present invention are possible in light of these teachings, and, it is, therefore, understood that, within the scope of this detailed description, the invention may be practiced other than as specifically taught.

We claim:

1. In a system for multiplying a binary digital multiplicand operand X by a binary digital multiplier operand Y, X and Y both being either sign magnitude or complemented binary numbers, an improvement for multiplying said operands without pre- or post- complementation, said improvement comprising:

storage means for holding two n-bit operands, X and Y, the bits of each operand being in a sequence in which bit significance decreases from a most significant bit to a least significant bit, each operand including at least one sign bit;

overlapped scanning means connected to said storage means for multiplying operand X with a sequence of multiplier bit groups obtained from operand Y, each group including s successive bits of Y and overlapping an adjacent group by at least one bit, s being greater than 3;

matrix assembly means connected to said overlapped scanning means and responsive to successive scans of X for producing a sequence of partial products assembled into a matrix including m+1 offset rows, where m=INT[(n−1)/(s−1)], each row including one of said partial products;

sign encoding means in said matrix assembly means and connected to said overlapped scanning means and responsive to said sequence of multiplier bit groups or to a multiplicand sign bit for appending sign encoding bits onto said partial products to complete said rows; and means connected to said matrix assembly means for adding said partial products, with said sign encoding bits appended, to produce a product of X multiplied by Y.

2. The improvement of claim 1 wherein said complemented binary numbers are binary digits with n−(s−1) bits in a sequence of descending significance from respective sign bits, $X_O$ and $Y_O$, to respective least significant bits, $X_{n-s}$ and $Y_{n-s}$, said improvement further including:

first and second registers in said storage means, each of said registers for storing an n-bit sign magnitude number in significance sequence from most to least significant bit or for storing an n−(s−1)-bit complemented binary number, said complemented binary number being stored in significance sequence from sign to least significant bit where the least significant n−(s−1) bits of said magnitude number are stored; and connected to each of said first and second registers, sign extension means for entering s−1 replications of the sign bit of a signed binary number where the most significant s−1 bits of a sign magnitude number are stored.

3. The improvement of claim 2 wherein X and Y are complemented binary numbers, and the first bit group of said sequence contains only bits identical to the sign of Y.

4. The improvement of claim 3, wherein said matrix, identified as P, is defined by:

$$P = \Phi_1 + \sum_{j=2}^{m} \Phi_j + \Phi_{m+1}$$

where $\Phi_j$ is a row of P produced by multiplying X with a multiplier bit group $(Y_{k-(s-2)} \ Y_{k-(s-1)} \ldots Y_{(k)} \ Y_{(k\pm 1)})$ and where $\Phi_j = S_j X |W_j|$, $|W_j|$ signifying the absolute value of $W_j$, $W_j$ being a coefficient by which X is multiplied to produce said jth row, and $S_j$ being the sign of said coefficient, where:

$$S_j = (Y_{k-(s-2)}) - W(0)$$

such that:

$$-W(0) = (Y_{k-(s-2)} Y_{k-(s-1)} Y_{(k-s)} \ldots Y_{(k)} Y_{(k+1)}) + (-Y_{k-(s-2)} - Y_{k-(s-1)} - Y_{(k-s)} \ldots - Y_k - Y_{(k+1)})$$

+ being logical "or", juxtaposition of terms being their logical "AND", and − indicating the logical complement.

5. The improvement of claim 4 wherein for the j-th row of said matrix, 2≦j≦m, said sign encoding means appends a sequence of s−1 sign extension bits on the jth partial product, said sign extension bits including s−2 ones followed by a last bit, b, having a value determined by:

$$b = -[(X_{sign} \vee S_j) W(0)]$$

where $X_{sign}$ is the sign bit of X and V denotes the "exclusive OR" operation.

6. The improvement of claim 5 wherein each of said partial products has a most significant end and said (s−1) sign extension bits are appended to the most significant end of each of said partial products, said bit b being adjacent the most significant partial product bit.

7. The improvement of claim 6 wherein a sequence of s sign extension bits is appended to the most significant end of the last row of said matrix, the first of said s sign extension bits being determined by:

$$bit = -[(X_{sign} \vee S_j) - W(0)]$$

and each of the next s−1 of said sign extension bits being determined by:

$$bits = [(X_{sign} \vee S_j) \cdot W(0)].$$

8. In a multi-bit overlapped scanning multiplier for multiplying n-bit sign magnitude operands X and Y to produce a product, said multiplier including means for producing an overlapped scan matrix having m+1 rows in which each row includes a partial product produced by multiplying X with one of a sequence of bit groups of Y, each bit group overlapping an adjacent bit group, each bit group including s bits, an improvement for multiplying a pair of two's complement binary operands $X_{tc}$ and $Y_{tc}$ each including n−(s−1) bits arranged in significance sequence from a bit 0, a sign bit, through bit n−s, said improvement comprising:

extension means for extending the sign bits of $X_{tc}$ and $Y_{tc}$ by appending to $X_{tc}$ s−1 replications of $X_0$, the sign bit of X, and by appending to $Y_{tc}$ s−1 replications of $Y_0$, the sign bit of Y;

matrix means connected to said extension means for producing a banded matrix of overlapped rows, each row including a respective partial product of n+1 bits produced by multiplying $X_{tc}$ with a respective s-bit group of $Y_{tc}$ said bit group including bits $Y_{(k-s-2)} \ Y_{(k-s-1)} \ Y_{(k-s)} \ldots Y_{(k)} \ Y_{(k+1)}$, in significance sequence, and said s-bit group overlapping a next s-bit group by $Y_{k+1}$, said matrix including m+1 rows, where:

$$m = INT[(n-1)/(s-1)]$$

and said matrix including j middle rows, 2≦j≦m, in which each row $\Phi_j$, is given by:

$$\Phi_j = S_j X_{tc} |W_j|$$

where $S_j$ is the sign of the jth row and $|W_j|$ is the absolute value of a coefficient $W_j$ by which $X_{tc}$ is multiplied to produce said jth row; and sign means for computing the sign $S_j$ of the jth row of said matrix according to:

$$S_j = Y_{(k-s-2)} - W(o)$$

where:

$$W(o) = (Y_{(k-s-2)} Y_{(k-s-1)} Y_{(k-s)} \ldots Y_{(k)} Y_{(k+1)}) + (-Y_{(k-s-2)} - Y_{(k-s-1)} - Y_{(k-s)} \ldots - Y_{(k)} - Y_{(k+1)}).$$

* * * * *

UNITED STATES PATENT AND TRADEMARK OFFICE
CERTIFICATE OF CORRECTION

PATENT NO. : 4,926,371

DATED : May 15, 1990

INVENTOR(S) : Vassiliadis et al

It is certified that error appears in the above-identified patent and that said Letters Patent is hereby corrected as shown below:

Col. 23, line 51, please change "+" to --+--

Signed and Sealed this

Sixteenth Day of March, 1993

*Attest:*

STEPHEN G. KUNIN

*Attesting Officer*     *Acting Commissioner of Patents and Trademarks*